(12) United States Patent
Pfeiffer et al.

(10) Patent No.: US 10,550,242 B2
(45) Date of Patent: Feb. 4, 2020

(54) PLASTICISER COMPOSITION CONTAINING ALIPHATIC DICARBOXYLIC ACID ESTERS AND DIESTERS SELECTED FROM 1,2-CYCLOHEXANE DICARBOXYLIC ACID ESTERS AND TEREPHTHALIC ACID ESTERS

(71) Applicant: BASF SE, Ludwigshafen am Rhein (DE)

(72) Inventors: Matthias Pfeiffer, Böhl-lggelheim (DE); Boris Breitscheidel, Waldsee (DE); Axel Grimm, Edenkoben (DE); Herbert Morgenstern, Ellerstadt (DE)

(73) Assignee: BASF SE (DE)

( * ) Notice: Subject to any disclaimer, the term of this patent is extended or adjusted under 35 U.S.C. 154(b) by 0 days.

(21) Appl. No.: 16/071,249

(22) PCT Filed: Jan. 19, 2017

(86) PCT No.: PCT/EP2017/051018
§ 371 (c)(1),
(2) Date: Jul. 19, 2018

(87) PCT Pub. No.: WO2017/125458
PCT Pub. Date: Jul. 27, 2017

(65) Prior Publication Data
US 2019/0359789 A1 Nov. 28, 2019

(30) Foreign Application Priority Data
Jan. 20, 2016 (EP) .................................... 16152103

(51) Int. Cl.
*C08K 5/12* (2006.01)
*C08K 5/11* (2006.01)

(52) U.S. Cl.
CPC .................. *C08K 5/12* (2013.01); *C08K 5/11* (2013.01); *C08K 2201/014* (2013.01)

(58) Field of Classification Search
CPC ....... C08K 5/12; C08K 5/11; C08K 2201/014
(Continued)

(56) References Cited

U.S. PATENT DOCUMENTS

| 2,419,137 A | 4/1947 | Hetherington |
| 2,921,089 A | 1/1960 | Hagemeyer, Jr. et al. |

(Continued)

FOREIGN PATENT DOCUMENTS

| DE | 1593368 A1 | 7/1970 |
| DE | 1945359 A1 | 3/1971 |

(Continued)

OTHER PUBLICATIONS

International Search Report for PCT/EP2017/051018 dated Apr. 18, 2017.

(Continued)

*Primary Examiner* — William K Cheung
(74) *Attorney, Agent, or Firm* — Drinker Biddle & Reath LLP

(57) ABSTRACT

The present invention relates to a plasticizer composition which comprises one or more aliphatic dicarboxylic esters of the general formula (I) and one or more diesters of the general formula (II), selected from 1,2-cyclohexanedicarboxylic esters and terephthalic esters, and also to molding compositions which comprise a thermoplastic polymer or an elastomer and one such plasticizer composition, and to the use of these plasticizer compositions and molding compositions.

20 Claims, 10 Drawing Sheets

Figure 1:
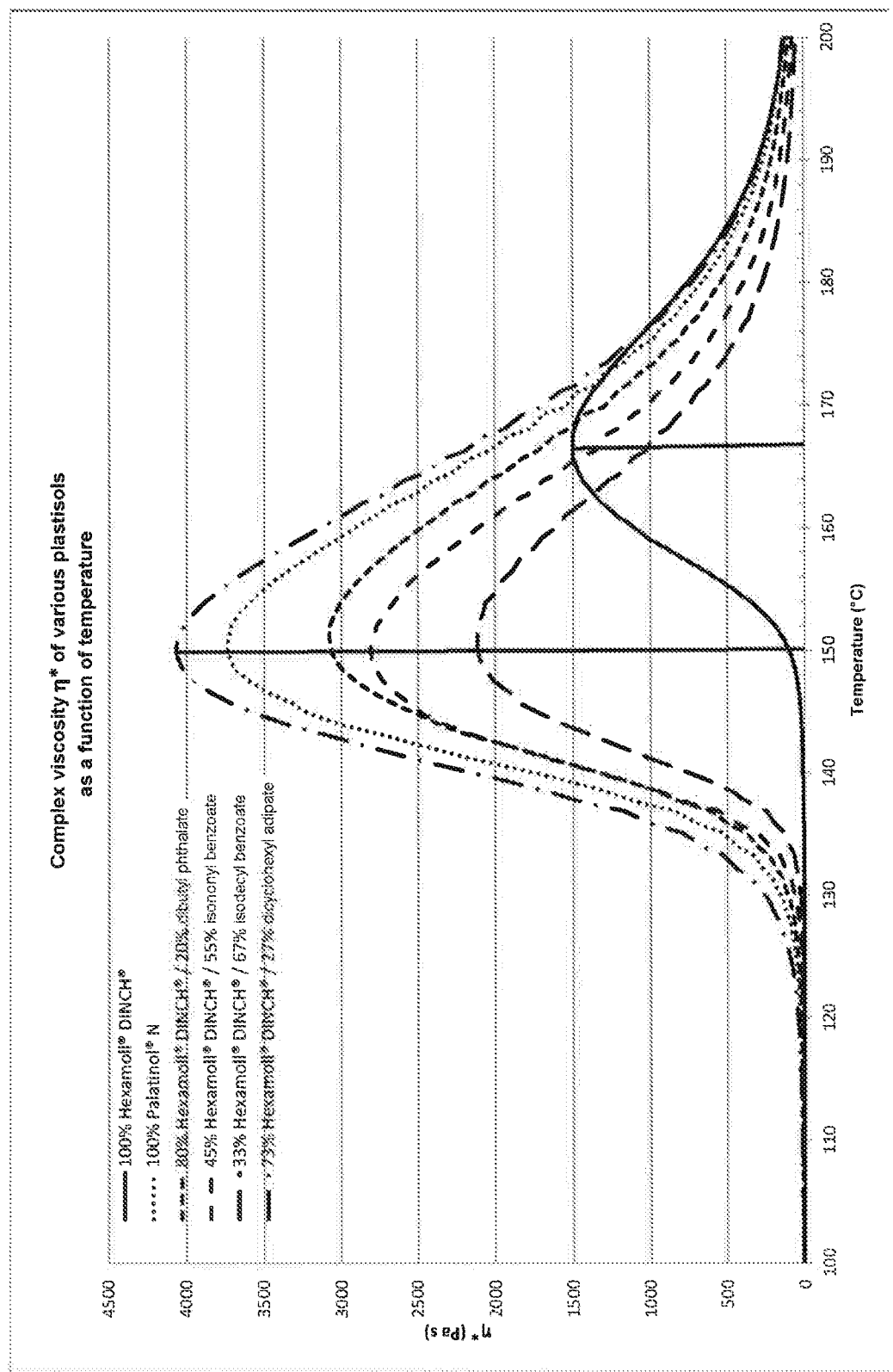

(58) Field of Classification Search
USPC .......................................................... 524/292
See application file for complete search history.

(56) References Cited

U.S. PATENT DOCUMENTS

| | | | |
|---|---|---|---|
| 3,418,351 | A | 12/1968 | Greene et al. |
| 3,932,523 | A | 1/1976 | Strohmeyer et al. |
| 4,148,830 | A | 4/1979 | Pruett et al. |
| 4,426,524 | A | 1/1984 | Plummer |
| 5,288,918 | A | 2/1994 | Maher et al. |
| 5,321,155 | A | 6/1994 | Drinkard et al. |
| 5,324,853 | A | 6/1994 | Jones et al. |
| 5,434,313 | A | 7/1995 | Harrison et al. |
| 5,696,297 | A | 12/1997 | Kneuper et al. |
| 5,849,972 | A | 12/1998 | Vicari et al. |
| 6,225,507 | B1 | 5/2001 | Giessler et al. |
| 6,284,917 | B1 | 9/2001 | Brunner et al. |
| 6,310,235 | B1 | 10/2001 | Gick |
| 6,310,261 | B1 | 10/2001 | Geissler et al. |
| 6,437,170 | B1 | 8/2002 | Thil et al. |
| 6,723,884 | B1 | 4/2004 | Grenacher et al. |
| 6,765,119 | B2 | 7/2004 | Hoffmann et al. |
| 7,173,138 | B2 | 2/2007 | Ahlers et al. |
| 7,205,349 | B2 | 4/2007 | Koch et al. |
| 7,208,545 | B1 | 4/2007 | Brunner et al. |
| 7,319,161 | B2 | 1/2008 | Noe et al. |
| 7,323,588 | B2 | 1/2008 | Grass et al. |
| 7,385,075 | B2 | 6/2008 | Disteldorf et al. |
| 7,973,194 | B1 | 7/2011 | Kinkade et al. |
| 8,329,796 | B2 | 12/2012 | Grass |
| 9,084,983 | B2 | 7/2015 | Königsmann et al. |
| 2012/0046402 | A1* | 2/2012 | Senda .................... B29C 43/24 524/296 |
| 2013/0317152 | A1 | 11/2013 | Becker et al. |
| 2016/0053083 | A1 | 2/2016 | Rhers et al. |
| 2016/0264509 | A1 | 9/2016 | Kaller et al. |
| 2017/0145186 | A1 | 5/2017 | Pfeiffer et al. |
| 2017/0233548 | A1 | 8/2017 | Pfeiffer et al. |
| 2017/0313850 | A1 | 11/2017 | Pfeiffer et al. |
| 2018/0282510 | A1 | 10/2018 | Pfeiffer et al. |

FOREIGN PATENT DOCUMENTS

| | | |
|---|---|---|
| DE | 2139630 A1 | 2/1973 |
| DE | 2244373 A1 | 4/1974 |
| DE | 2404855 A1 | 8/1975 |
| DE | 2445303 A1 | 4/1976 |
| DE | 2612355 A1 | 10/1977 |
| DE | 2628987 A1 | 1/1978 |
| DE | 3228881 A1 | 2/1984 |
| DE | 4339713 A1 | 5/1995 |
| EP | 366089 A2 | 5/1990 |
| EP | 432124 A2 | 6/1991 |
| EP | 695734 A1 | 2/1996 |
| EP | 880494 B1 | 5/2000 |
| EP | 1047655 B1 | 5/2003 |
| EP | 1354867 A2 | 10/2003 |
| EP | 1415978 A1 | 5/2004 |
| GB | 1512797 A | 6/1978 |
| GB | 1579159 A | 11/1980 |
| RU | 2057115 C1 | 3/1996 |
| WO | WO-9514647 A1 | 6/1995 |
| WO | WO-9730016 A1 | 8/1997 |
| WO | WO-9823566 A1 | 6/1998 |
| WO | WO-9932427 A1 | 7/1999 |
| WO | WO-2000063151 A1 | 10/2000 |
| WO | WO-0078704 A1 | 12/2000 |
| WO | WO-01014297 A1 | 3/2001 |
| WO | WO-200187809 A1 | 11/2001 |
| WO | WO-200238531 A1 | 5/2002 |
| WO | WO-2002066412 A1 | 8/2002 |
| WO | WO-200283695 A1 | 10/2002 |
| WO | WO-03029339 A1 | 4/2003 |
| WO | WO-05028407 A1 | 3/2005 |
| WO | WO-2009095126 A1 | 8/2009 |
| WO | WO-2011082991 A2 | 7/2011 |
| WO | WO-2012069278 A1 | 5/2012 |
| WO | WO-2014166955 A2 | 10/2014 |
| WO | WO-2016026835 A1 | 2/2016 |

OTHER PUBLICATIONS

Written Opinion of the International Searching Authority for PCT/EP2017/051018 dated Apr. 18, 2017.
U.S. Appl. No. 15/764,128, filed Mar. 28, 2018.

* cited by examiner

PLASTICISER COMPOSITION CONTAINING ALIPHATIC DICARBOXYLIC ACID ESTERS AND DIESTERS SELECTED FROM 1,2-CYCLOHEXANE DICARBOXYLIC ACID ESTERS AND TEREPHTHALIC ACID ESTERS

CROSS-REFERENCE TO RELATED APPLICATIONS

This application is a national stage application (under 35 U.S.C. § 371) of PCT/EP2017/051018, filed Jan. 19, 2017, which claims benefit of European Application No. 16152103.4, filed Jan. 20, 2016, both of which are incorporated herein by reference in their entirety.

BACKGROUND OF THE INVENTION

The present invention relates to a plasticizer composition which comprises one or more aliphatic dicarboxylic esters and one or more diesters selected from 1,2-cyclohexanedicarboxylic esters and terephthalic esters, and also to molding compositions which comprise a thermoplastic polymer or an elastomer and one such plasticizer composition, and to the use of these plasticizer compositions and molding compositions.

PRIOR ART

Desired processing properties or desired performance properties are achieved in many plastics by adding what are known as plasticizers, in order to render the plastics softer, more flexible and/or more extensible. In general, the use of plasticizers serves to shift the thermoplastic range of plastics toward lower temperatures, so that the desired elastic properties are obtained in the region of low processing temperatures and service temperatures.

Production quantities of polyvinyl chloride (PVC) are among the highest of any plastic. Because of the versatility of this material, it is nowadays found in a wide variety of products used in everyday life. PVC therefore has very great economic importance. Intrinsically, PVC is a plastic which is hard and brittle at up to about 80° C., and is used in the form of rigid PVC (PVC-U) by addition of heat stabilizers and other adjuvants. Flexible PVC (PVC-P) is obtained only by adding suitable plasticizers, and can be used for many applications for which rigid PVC is unsuitable.

Examples of other important thermoplastic polymers in which plasticizers are usually used are polyvinyl butyral (PVB), homopolymers and copolymers of styrene, polyacrylates, polysulfides, or thermoplastic polyurethanes (PU).

The suitability of a substance for use as a plasticizer for a particular polymer depends largely on the properties of the polymer that is to be plasticized. The desire is generally for plasticizers which enjoy high compatibility with the polymer to be plasticized, which endow it with good thermoplastic properties, and which possess only low propensity to evaporation and/or exudation (high permanence).

A host of different compounds are available on the market for the plasticizing of PVC and other plastics. On account of their high compatibility with PVC and because of their advantageous performance properties, phthalic diesters with alcohols of various chemical structures have been much used in the past as plasticizers, examples being diethylhexyl phthalate (DEHP), diisononyl phthalate (DINP), and diisodecyl phthalate (DIDP). Short-chain phthalates, e.g. dibutyl phthalate (DBP), diisobutyl phthalate (DIBP), benzyl butyl phthalate (BBP) or diisoheptyl phthalate (DIHP), are also used as fast fusers, for example in the production of what are known as plastisols. It is also possible to use dibenzoic esters, such as dipropylene glycol dibenzoates, for the same purpose alongside the short-chain phthalates. Phenyl and cresyl esters of alkylsulfonic acids are examples of another class of plasticizers with good gelling properties, and are obtainable with trademark Mesamoll®.

Plastisols initially are a suspension of finely pulverulent plastics in liquid plasticizers. The solvation rate of the polymer in the plasticizer here is very low at ambient temperature. The polymer is noticeably solvated in the plasticizer only on heating to relatively high temperatures. The individual isolated polymer aggregates here swell and fuse to give a three-dimensional high-viscosity gel. This procedure is termed gelling, and begins at a certain minimum temperature which is termed gel point or solvation temperature. The gelling step is not reversible.

Since plastisols take the form of liquids, they are very often used for the coating of a very wide variety of materials, e.g. textiles, glass nonwovens, etc. This coating is very often composed of a plurality of sublayers.

In a procedure often used in the industrial processing of plastisol products, a layer of plastisol is therefore applied and directly thereafter the plastic, in particular PVC, with the plasticizer is subjected to incipient gelling above the solvation temperature, thus producing a solid layer composed of a mixture of gelled, partially gelled, and ungelled polymer particles. The next sublayer is then applied to this incipiently gelled layer, and once the final layer has been applied the entire structure is processed in its entirety to give the fully gelled plastics product by heating to relatively high temperatures.

Another possibility, alongside production of plastisols, is production of dry pulverulent mixtures of plasticizer and polymers. These dry blends, in particular based on PVC, can then be further processed at elevated temperatures for example by extrusion to give pellets, or processed through conventional shaping processes, such as injection molding, extrusion, or calendering, to give the fully gelled plastics product.

Plasticizers with good gelling properties are additionally required because of increasing technical and economic demands on the processing of thermoplastic polymers and elastomers.

In particular in the production and processing of PVC plastisols, for example for producing PVC coatings, it is inter alia desirable to have available, as fast fuser, a plasticizer with low gelling point. High storage stability of the plastisol is moreover also desirable, i.e. the ungelled plastisol is intended to exhibit no, or only a slight, viscosity rise over the course of time at ambient temperature. As far as possible, these properties are intended to be achieved by addition of a suitable plasticizer with rapid-gelling properties, with no need for the use of other viscosity-reducing additives and/or of solvents.

However, fast fusers generally often have unsatisfactory compatibility with the additized polymers. Moreover, they usually exhibit high volatility both on processing and in use of the final products. Moreover, the addition of fast fusers in many cases has a deleterious effect on the mechanical properties of the final products. Another known method for establishing the desired plasticizer properties is therefore to use mixtures of plasticizers, e.g. at least one plasticizer which provides good thermoplastic properties but provides relatively poor gelling, in combination with at least one fast fuser.

Furthermore, there is a need to replace at least some of the aforementioned phthalate plasticizers, given that they are suspected of being injurious to health. This is especially so for sensitive areas of application, such as children's toys, food packaging, or medical articles.

Known in the prior art are a variety of alternative plasticizers with different properties for a diversity of plastics, and especially for PVC.

One class of plasticizer known from the prior art, and able to be used as an alternative to phthalates, is based on cyclohexanepolycarboxylic acids, as described in WO 99/32427. In contrast to their unhydrogenated aromatic analogs, these compounds are toxicologically unobjectionable and can be used even in sensitive areas of application.

WO 00/78704 describes selected dialkyl cyclohexane-1, 3- and -1,4-dicarboxylic esters for use as plasticizers in synthetic materials.

U.S. Pat. No. 7,973,194 B1 teaches the use of dibenzyl cyclohexane-1,4-dicarboxylate, benzyl butyl cyclohexane-1,4-dicarboxylate, and dibutyl cyclohexane-1,4-dicarboxylate as fast-gelling plasticizers for PVC.

Another known measure for setting the desired plasticizer properties is to use mixtures of plasticizers—for example, at least one plasticizer which imparts good thermoplastic properties but does not gel so well, in combination with at least one plasticizer which imparts good gelling properties.

WO 03/029339 discloses PVC compositions comprising cyclohexanepolycarboxylic esters, and also mixtures of cyclohexanepolycarboxylic esters with other plasticizers. Suitable other plasticizers stated are non-polymeric ester plasticizers, such as terephthalic esters, phthalic esters, isophthalic esters, and adipic esters. Further disclosed are PVC compositions comprising mixtures of cyclohexanepolycarboxylic esters with various fast-gelling plasticizers. Suitable fast-gelling plasticizers mentioned are, in particular, various benzoates, aromatic sulfonic esters, citrates, and also phosphates.

EP 1354867 describes isomeric isononyl benzoates, mixtures thereof with alkyl phthalates, alkyl adipates, or alkyl cyclohexanedicarboxylates, and a process for preparing them. EP 1354867 further describes the use of said mixtures as plasticizers in plastics, especially in PVC and PVC plastisols. In order to achieve a gelling temperature sufficiently low for plastisol applications, large amounts of these isononyl benzoates have to be used. These plasticizers, moreover, exhibit a high volatility, and adding them is detrimental to the mechanical properties of the final products.

EP 1415978 describes isomeric isodecyl benzoates, mixtures thereof with alkyl phthalates, alkyl adipates, or alkyl cyclohexanedicarboxylates, and the use of these mixtures as plasticizers for polymers, particularly as plasticizers for PVC and PVC plastisols. In order to achieve a gelling temperature sufficiently low for plastisol applications, it is necessary here as well to use large amounts of these isodecyl benzoates. Moreover, these plasticizers likewise exhibit high volatility, and adding them is detrimental to the mechanical properties of the final products.

U.S. Pat. No. 2,419,137 describes the synthesis of dicyclohexyl adipate from cyclohexanol and adipic acid reactants by sulfuric acid catalysis with copper sulfate salts.

WO 14/166955 describes among others the synthesis of dicyclohexyl adipate by sulfuric acid-catalyzed esterification of adipic acid with twice the amount of cyclohexanol at 140° C. The patent, however, discloses no data on the use of dicyclohexyl adipate as a plasticizer in PVC, and in particular does not disclose any fast-gelling properties for this compound.

U.S. Pat. No. 5,321,155 discloses the synthesis of dicyclohexyl adipate using benzene, cyclohexene, adipic acid, and a catalyst. Subsequent reaction of the reaction mixture with nitric acid leads to the preparation of pure adipic acid. The aim of this patent specification here, however, is to find an easier way to arrive by means of simple steps at the preparation of pure adipic acid, starting from the reaction product of the single hydrogenation of benzene, and without the isolation of the reaction products and without involving the step of conversion to cyclohexanol and/or cyclohexanone. U.S. Pat. No. 5,321,155 does not disclose any use of dicyclohexyl adipate in PVC.

The handbook "The Technology of Plasticizers", J. Kern Sears, Joseph R. Darby, 1982, John Wiley & Sons, Inc. briefly mentions dicyclohexyl adipate and discloses only little data, in a mixture of PVC containing 67 phr, in respect of volatility and extraction behavior.

EP 432124 B1 discloses the use of dicyclohexyl adipate in mixtures with polyvinyl butyral. Disclosed therein in particular are the advantages of a combination of mixed esters of adipic acid with polyvinyl butyral, by comparison with the pure diesters, such as dicyclohexyl adipate, for example. These mixtures serve as an interlayer in safety glazing systems, and have the advantage of improved UV resistance, reduced delamination tendency at the edges of the glass-plastic assembly, and improved impact absorption.

It is an object of the present invention to provide a plasticizer composition for thermoplastic polymers and elastomers which endows the molding composition on the one hand with good thermoplastic properties and on the other hand with good gelling properties, i.e., a very low gelling temperature. The plasticizer composition is intended as a result to be suitable particularly for the provision of plastisols. The plasticizer composition is to exhibit high compatibility with the polymer to be plasticized, is to possess high permanence, and is, moreover, to be toxicologically unobjectionable. Moreover, the intention is that the plasticizer composition shall exhibit low volatility both on processing and during use of the final products.

SUMMARY OF THE INVENTION

This object is surprisingly achieved by a plasticizer composition comprising a) one or two or more compound(s) of the general formula (I),

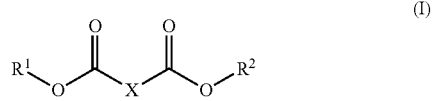

in which

X is an unbranched $C_2$-$C_8$ alkylene group or a branched $C_6$-$C_8$ alkylene group or an unbranched or branched $C_2$-$C_8$ alkenylene group, comprising at least one double bond, and $R^1$ and $R^2$ independently of one another are selected from $C_5$-$C_7$ cycloalkyl, wherein the cycloalkyl radicals independently of one another either are unsubstituted or are substituted by at least one $C_1$-$C_{10}$ alkyl radical, and
b) one or two or more compound(s) of the general formula (II),

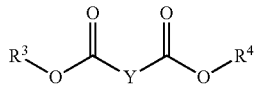
(II)

in which
R³ and R⁴ independently of one another are selected from branched and unbranched $C_1$-$C_{12}$ alkyl radicals,
Y is selected from the groups of the formulae (Y.a) and (Y.b)

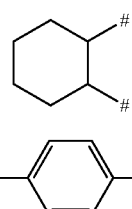
(Y.a)

(Y.b)

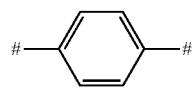

where # represents the respective points of attachment to the ester groups,
with the proviso that the plasticizer composition contains no compound of the formula (I.a)

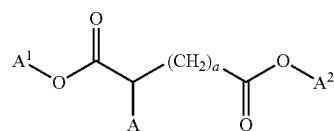
(I.a)

in which
A is methyl or ethyl,
A¹ and A² independently of one another are selected from branched and unbranched $C_5$-$C_7$ cycloalkyl radicals which are unsubstituted or are substituted by at least one $C_1$-$C_{10}$ alkyl radical, and
a is 1 or 2.

A first preferred subject is a plasticizer composition comprising
a) one or two or more compound(s) of the general formula (I),

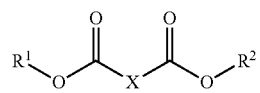
(I)

in which
X is an unbranched $C_2$-$C_8$ alkylene group or a branched $C_5$-$C_8$ alkylene group or an unbranched or branched $C_2$-$C_8$ alkenylene group, comprising at least one double bond, and
R¹ and R² independently of one another are selected from $C_5$-$C_7$ cycloalkyl, wherein the cycloalkyl radicals independently of one another either are unsubstituted or are substituted by at least one $C_1$-$C_{10}$ alkyl radical,
and
b) one or two or more compound(s) of the general formula (II.a),

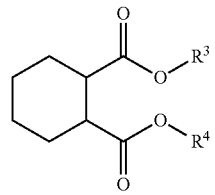
(II.a)

where
R³ and R⁴ independently of one another are selected from branched and unbranched $C_4$-$C_{12}$ alkyl radicals,
with the proviso that the plasticizer composition contains no compound of the formula (I.a)

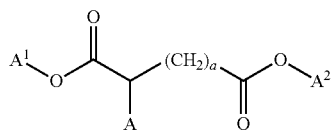
(I.a)

in which
A is methyl or ethyl,
A¹ and A² independently of one another are selected from branched and unbranched $C_5$-$C_7$ cycloalkyl radicals which are unsubstituted or are substituted by at least one $C_1$-$C_{10}$ alkyl radical, and
a is 1 or 2.

A second preferred subject is a plasticizer composition comprising
a) one or two or more compound(s) of the general formula (I),

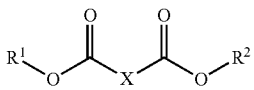
(I)

in which
X is an unbranched $C_2$-$C_8$ alkylene group or a branched $C_6$-$C_8$ alkylene group or an unbranched or branched $C_2$-$C_8$ alkenylene group, comprising at least one double bond, and
R¹ and R² independently of one another are selected from $C_5$-$C_7$ cycloalkyl, wherein the cycloalkyl radicals independently of one another either are unsubstituted or are substituted by at least one $C_1$-$C_{10}$ alkyl radical, and b) one or two or more compound(s) of the general formula (II.b),

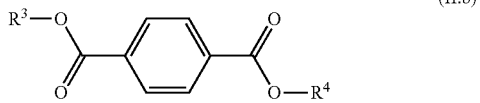

where

R³ and R⁴ independently of one another are selected from branched and unbranched $C_4$-$C_{12}$ alkyl radicals, with the proviso that the plasticizer composition contains no compound of the formula (I.a)

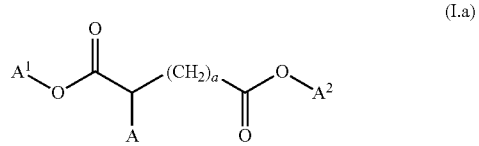

in which

A is methyl or ethyl,

A¹ and A² independently of one another are selected from branched and unbranched $C_5$-$C_7$ cycloalkyl radicals which are unsubstituted or are substituted by at least one $C_1$-$C_{10}$ alkyl radical, and a is 1 or 2.

A further subject of the invention are molding compositions which comprise at least one thermoplastic polymer or elastomer and a plasticizer composition as defined above and hereinafter.

A further subject of the invention are plastisols which comprise a plasticizer composition as defined above and hereinafter.

A further subject of the invention is the use of a plasticizer composition as defined above and hereinafter as plasticizer for thermoplastic polymers, more particularly polyvinyl chloride (PVC), and elastomers.

A further subject of the invention is the use of a plasticizer composition as defined above and hereinafter as plasticizer in plastisols.

A further subject of the invention is the use of these molding compositions for producing moldings and foils.

A BRIEF DESCRIPTION OF FIGURES

FIG. 1 shows the gelling performance of PVC plastisols which as plasticizers comprise specific blends of Hexamoll® DINCH® with dicyclohexyl adipate and di-n-butyl phthalate, and also of the commercially available fast fusers Vestinol® INB or Jayflex® MB 10. The fraction of the fast fuser in the plasticizer mixtures is selected so that the gelling temperature of Palatinol® N is attained. The plot is of the complex viscosity Θ*[Pa*s] of the plastisols as a function of the temperature [° C.]. Plotted additionally as a comparator is the gelling performance of PVC plastisols containing exclusively the commercially available plasticizers Hexamoll® DINCH® or Palatinol® N. The total plasticizer content of the plastisols is 100 phr.

Figure 2:
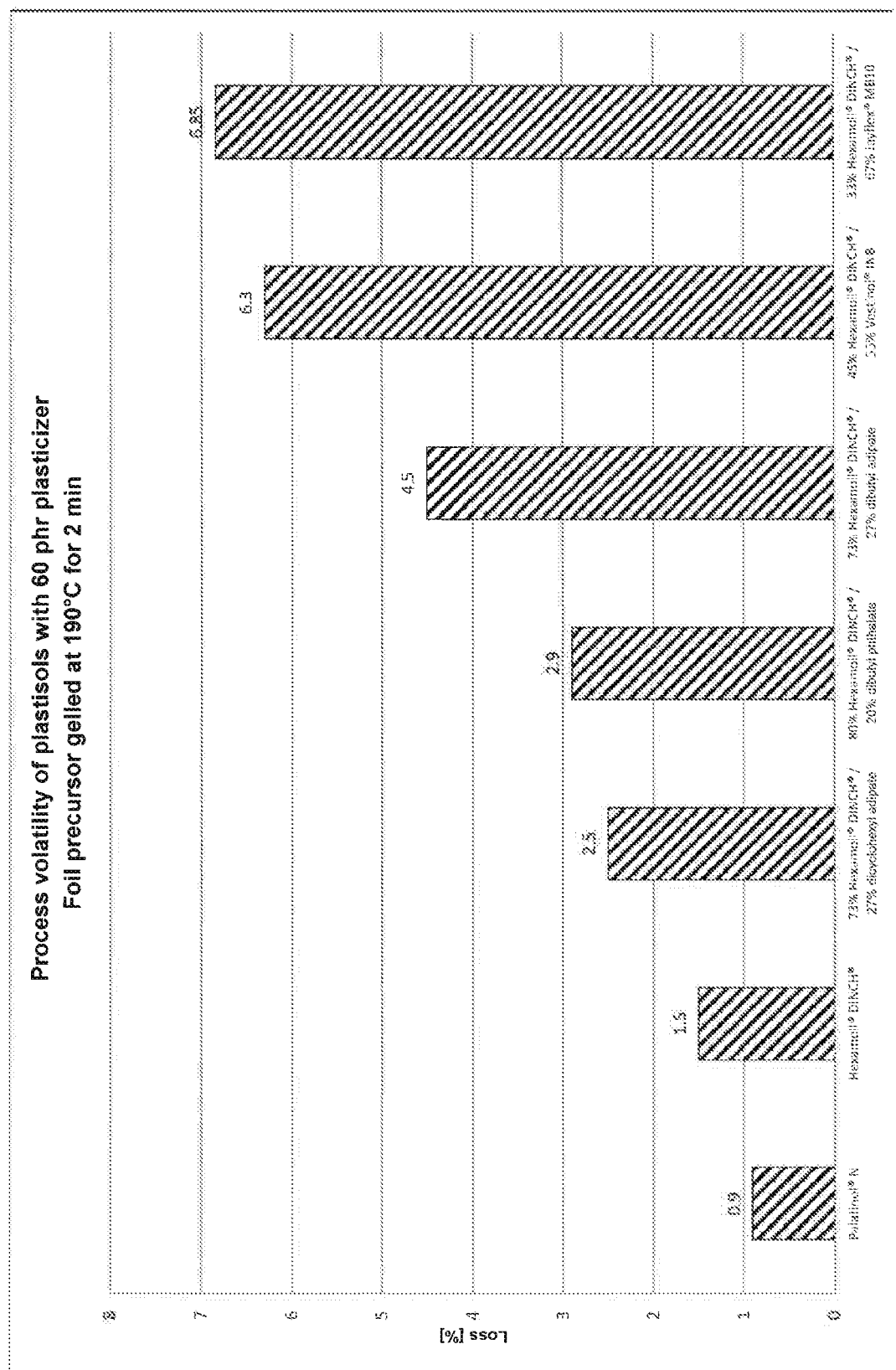

FIG. 2 shows the process volatility of PVC plastisols containing 60 phr of the inventive plasticizer composition and also various blends of Hexamoll® DINCH® with dibutyl phthalate, and also with the commercially available fast fusers Vestinol® INB or Jayflex® MB 10. The composition of the blends with Hexamoll® DINCH® corresponds to the concentrations shown in FIG. 1, so that a gelling temperature of 150° C. is attained. The plot is of the weight loss of the plastisols in %. Plotted additionally is the process volatility of PVC plastisols containing exclusively the commercially available plasticizers Hexamoll® DINCH® or Palatinol® N.

Figure 3:
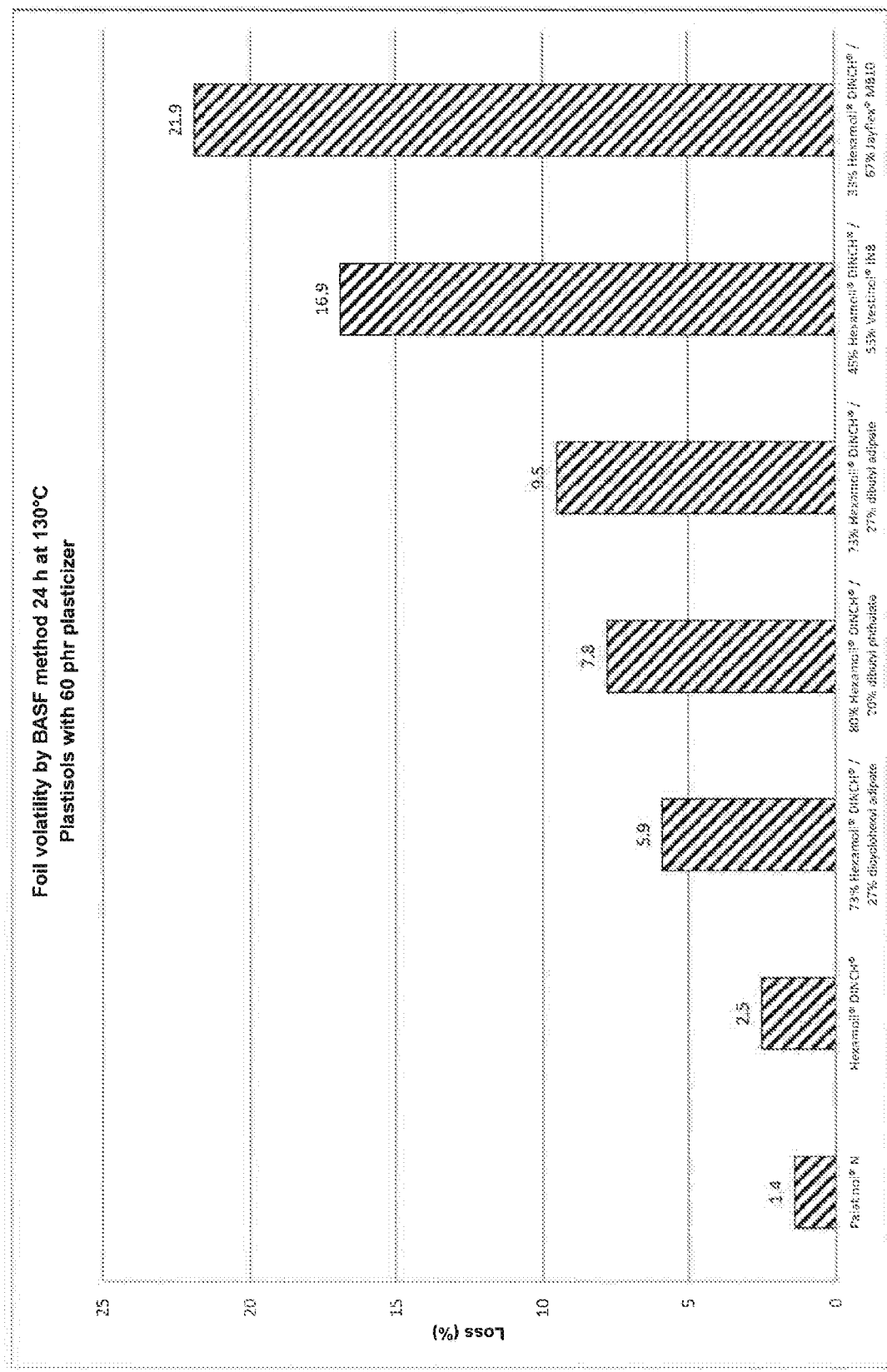

FIG. 3 shows the foil volatility of PVC foils produced from plastisols containing 60 phr of the inventively employed plasticizer composition and also various blends of Hexamoll® DINCH® with dibutyl phthalate, and also with the commercially available fast fusers Vestinol® INB or Jayflex® MB 10. The plot is of the weight loss of the PVC foils in percent. Plotted additionally is the foil volatility of PVC foils produced from plastisols containing exclusively the commercially available plasticizers Hexamoll® DINCH® or Palatinol® N.

Figure 4:
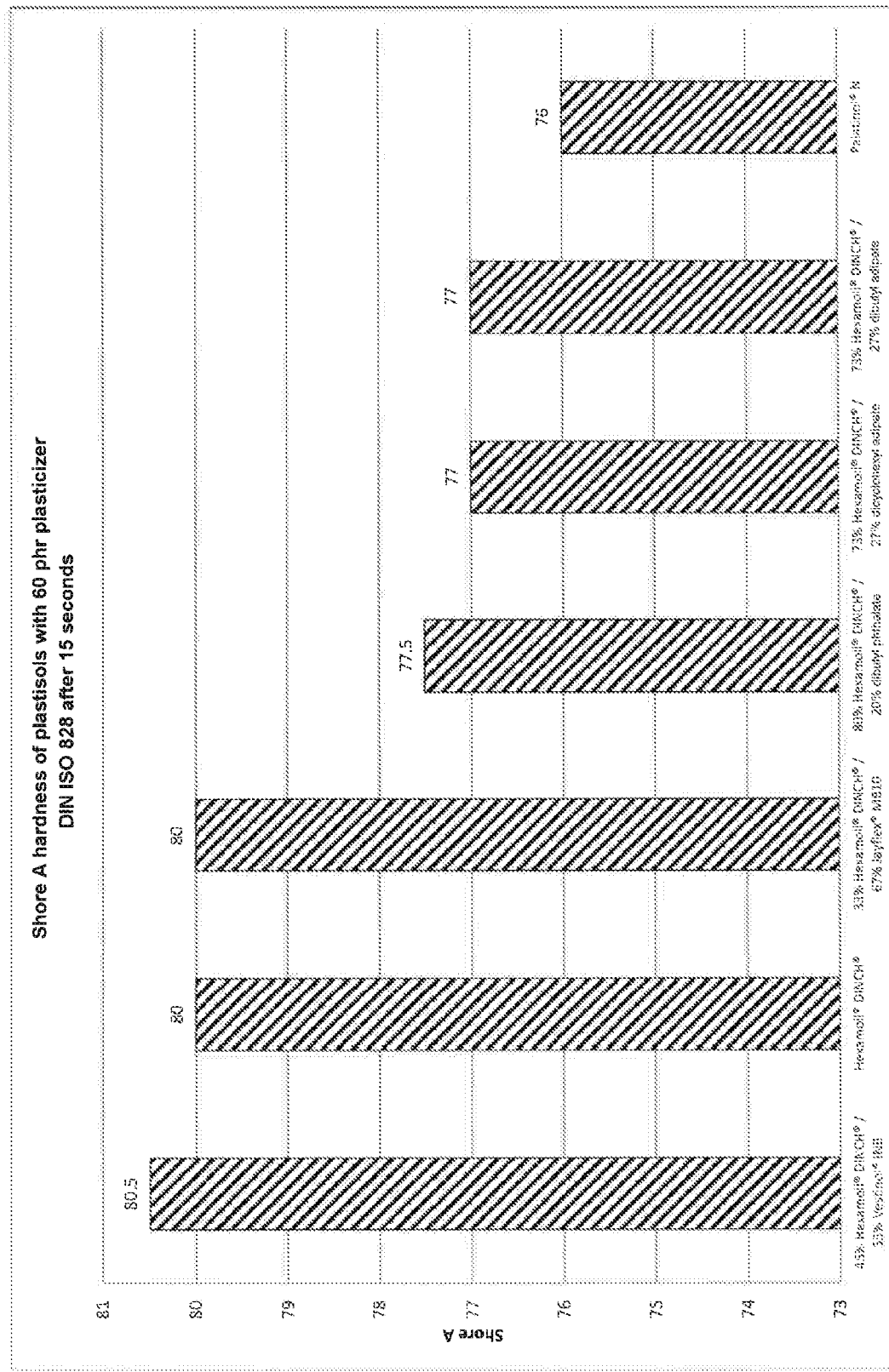

FIG. 4 shows the Shore A hardness volatility of PVC foils produced from PVC plastisols containing 60 phr of the inventively employed plasticizer composition and various blends of Hexamoll® DINCH® with dibutyl phthalate, and also with the commercially available gelling assistants Vestinol® INB or Jayflex® MB 10. Plotted additionally is the Shore A hardness of foils produced from PVC plastisols containing exclusively the commercially available plasticizers Hexamoll® DINCH® or Palatinol® N.

Figure 5:
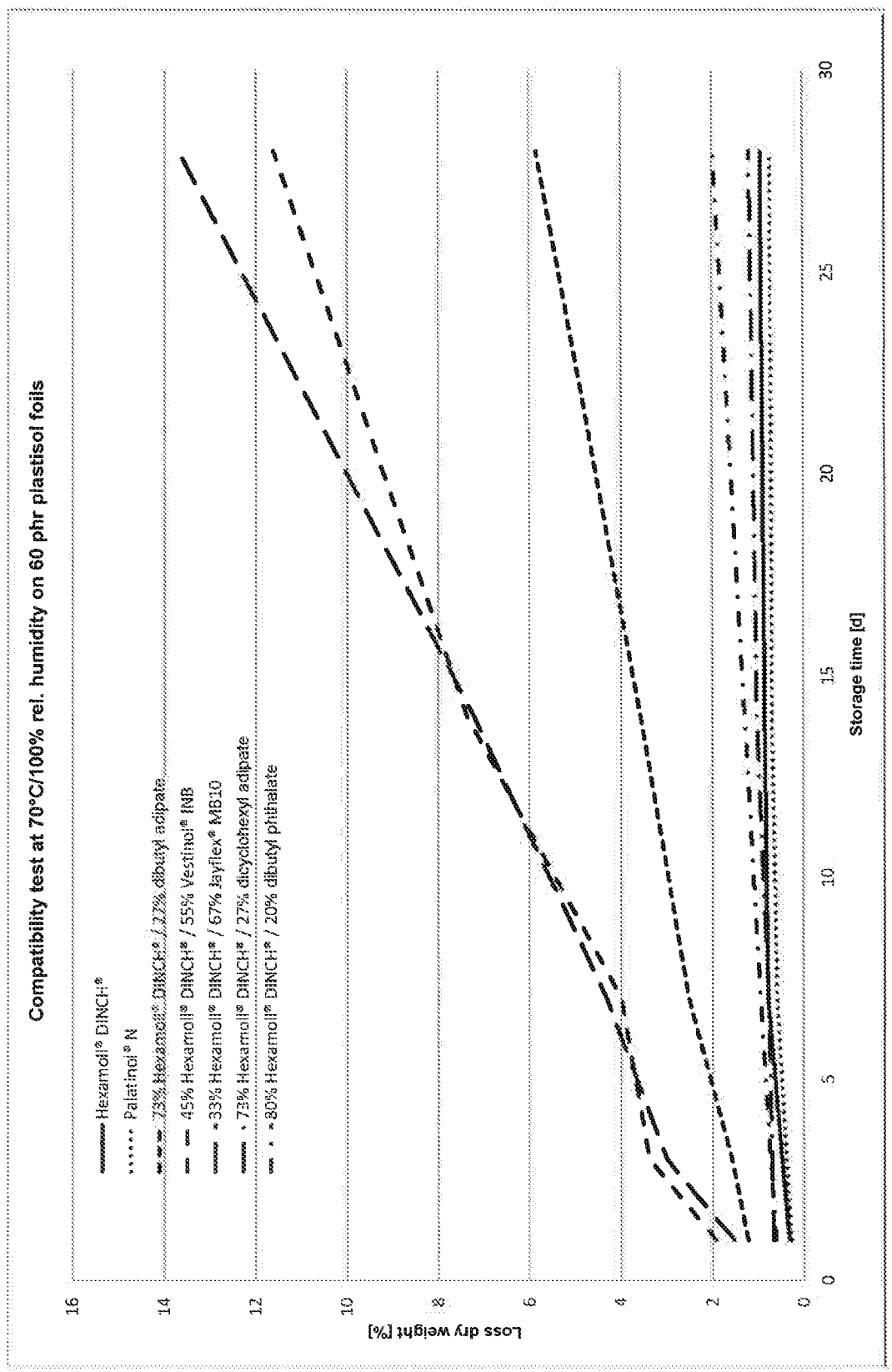

FIG. 5 shows the compatibility of PVC foils produced from plastisols containing 60 phr of the inventively employed plasticizer composition and various blends of Hexamoll® DINCH® with dibutyl phthalate, and also with the commercially available fast fusers Vestinol® INB or Jayflex® MB 10. Plotted additionally is the compatibility of foils produced from PVC plastisols containing exclusively the commercially available plasticizer Hexamoll® DINCH® or Palatinol® N. The plot is of the loss of dry weight [%] as a function of the storage time [d].

Figure 6:
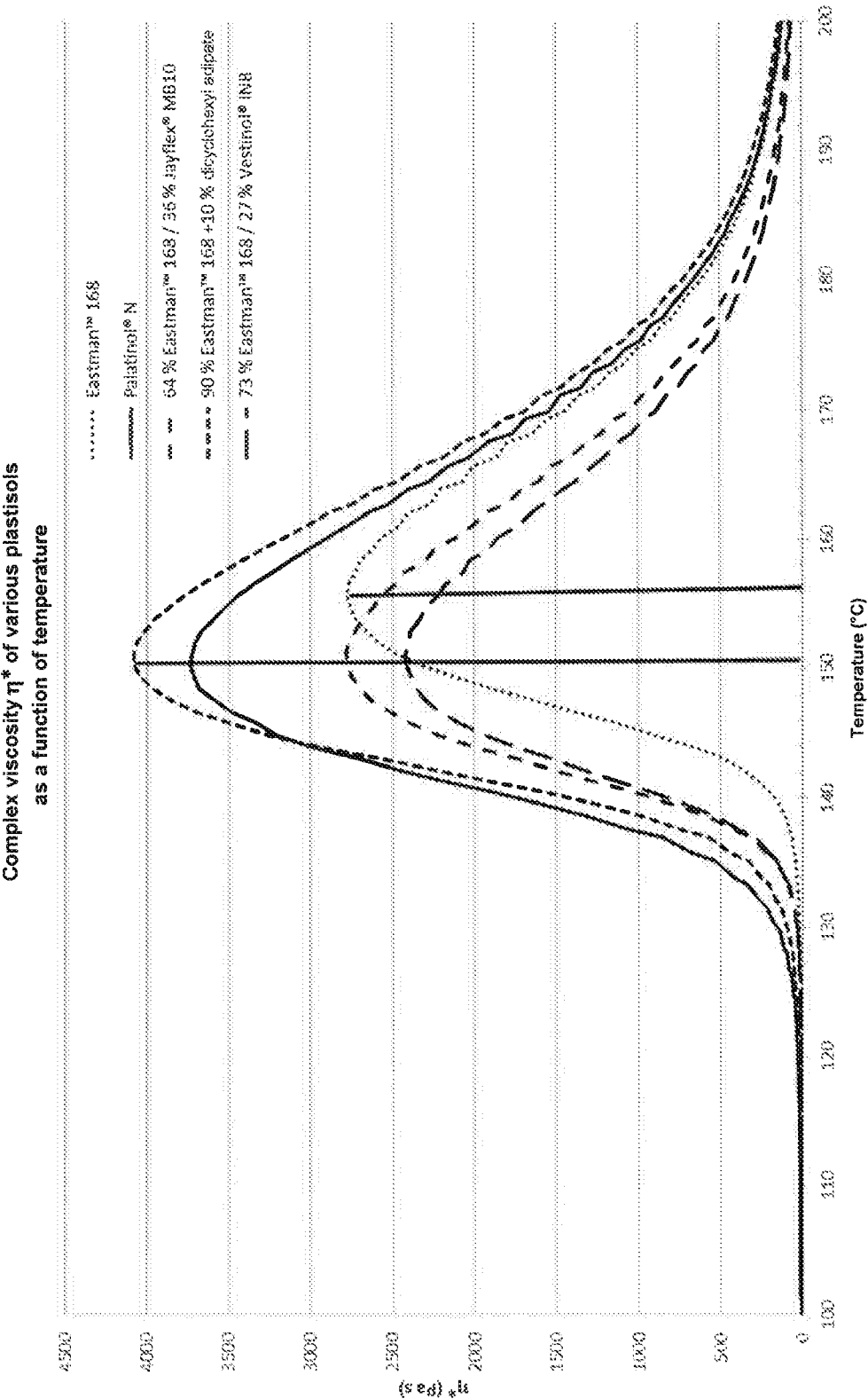

FIG. 6 shows the gelling performance of PVC plastisols which as plasticizers comprise specific blends of Eastman 168™ (di(2-ethylhexyl) terephthalate) with dicyclohexyl adipate, and also of the commercially available fast fusers Vestinol® INB or Jayflex® MB 10. The fraction of the fast fuser in the plasticizer mixtures is selected so that the gelling temperature of Palatinol® N is attained. The plot is of the complex viscosity η* [Pa*s] of the plastisols as a function of the temperature [° C.]. Plotted additionally as a comparator is the gelling performance of PVC plastisols containing exclusively the commercially available plasticizers Eastman 168™ or Palatinol® N. The total plasticizer content of the plastisols is 100 phr.

Figure 7:
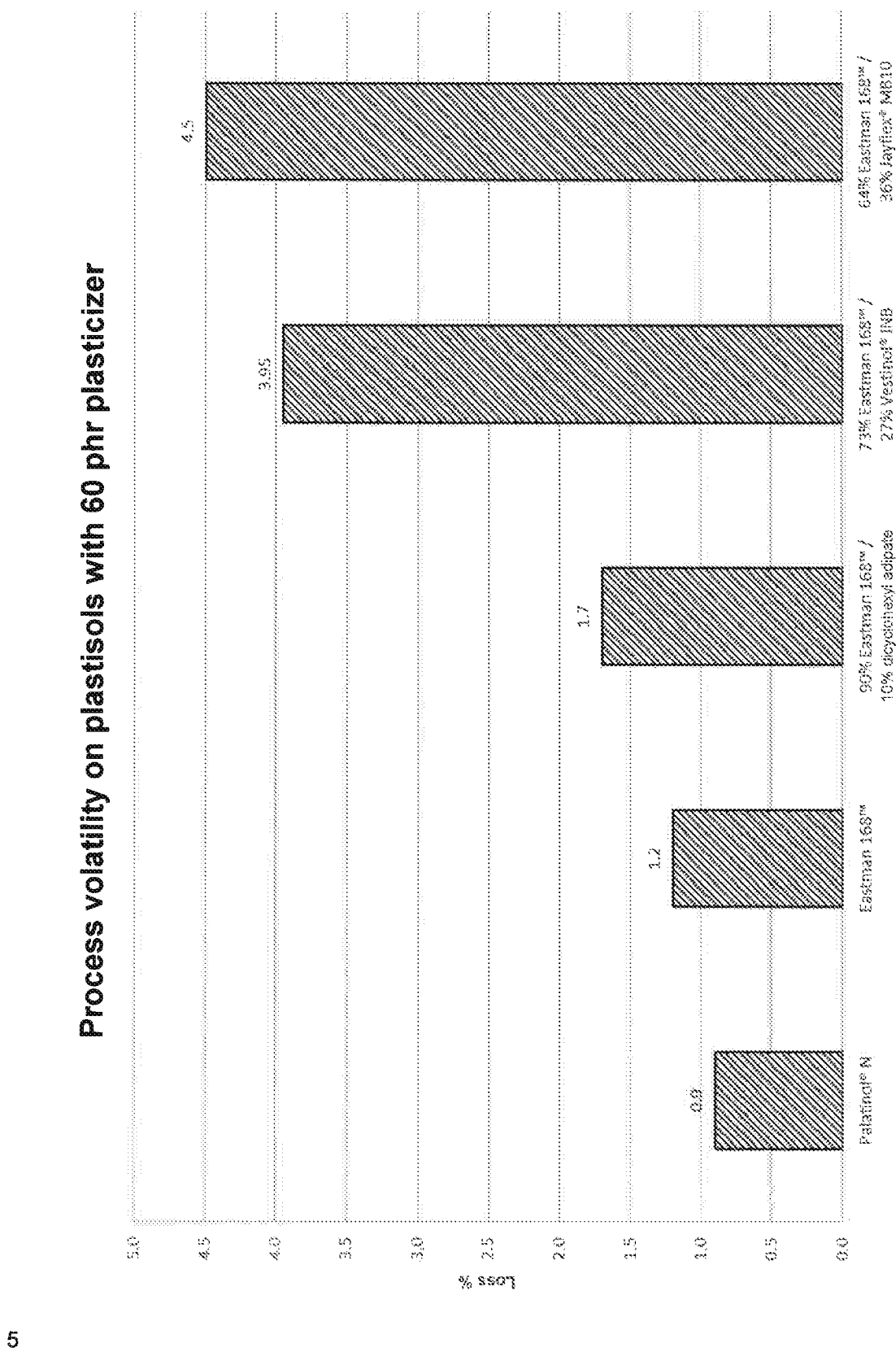

FIG. 7 shows the process volatility of PVC plastisols containing 60 phr of the inventive plasticizer composition and also various blends of Eastman 168™ with the commercially available fast fusers Vestinol® INB or Jayflex® MB 10. The composition of the blends with Eastman 168™ corresponds to the concentrations shown in FIG. 1, so that a gelling temperature of 150° C. is attained. The plot is of the weight loss of the plastisols in %. Plotted additionally is the process volatility of PVC plastisols containing exclusively the commercially available plasticizers Eastman 168™ or Palatinol® N.

Figure 8:
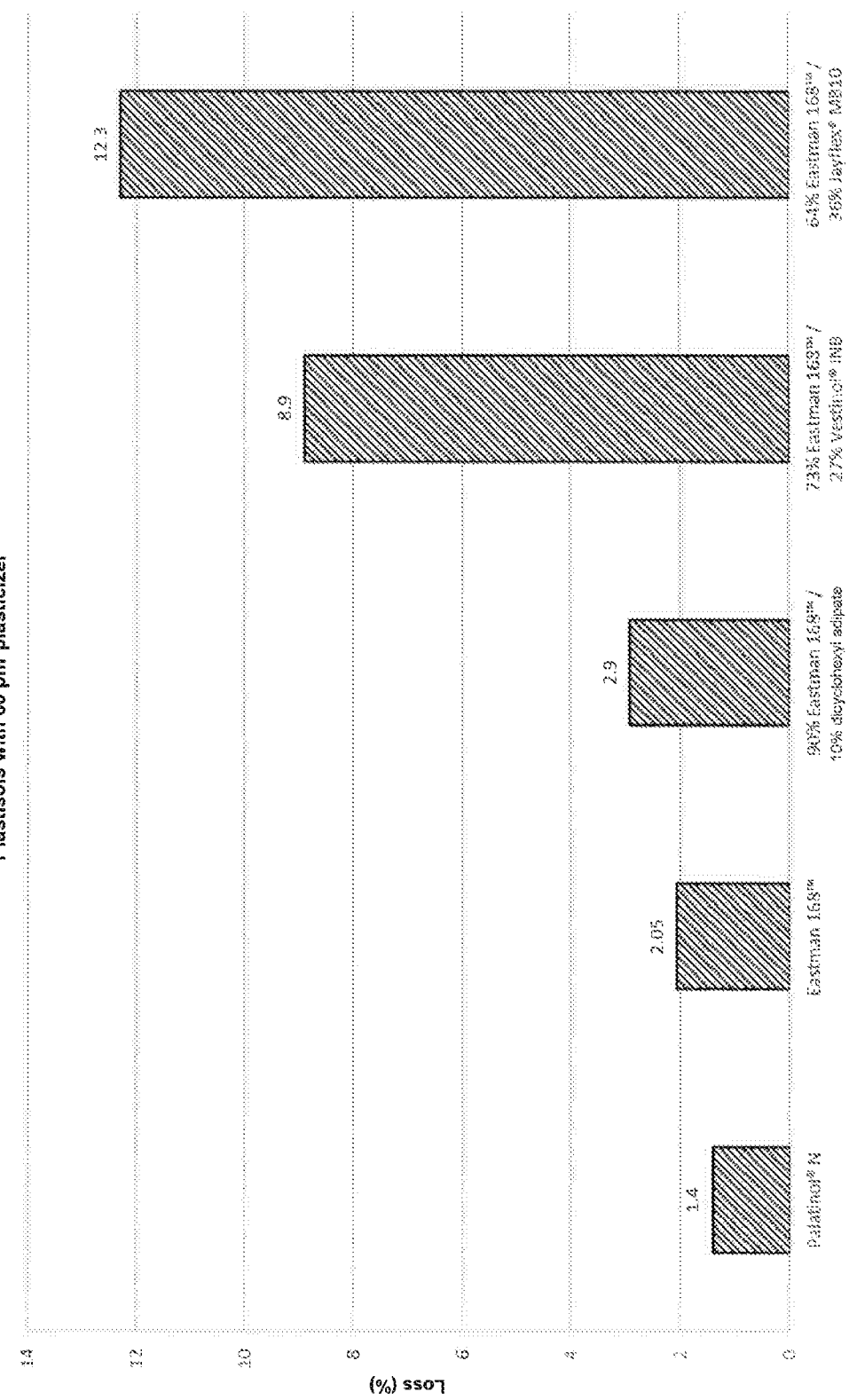

FIG. 8 shows the foil volatility of PVC foils produced from plastisols containing 60 phr of the inventively employed plasticizer compositions and also various blends of Eastman 168™ with the commercially available fast fusers Vestinol® INB or Jayflex® MB 10. The plot is of the weight loss of the PVC foils in percent. Plotted additionally is the foil volatility of PVC foils produced from plastisols containing exclusively the commercially available plasticizers Eastman 168™ or Palatinol® N.

Figure 9:
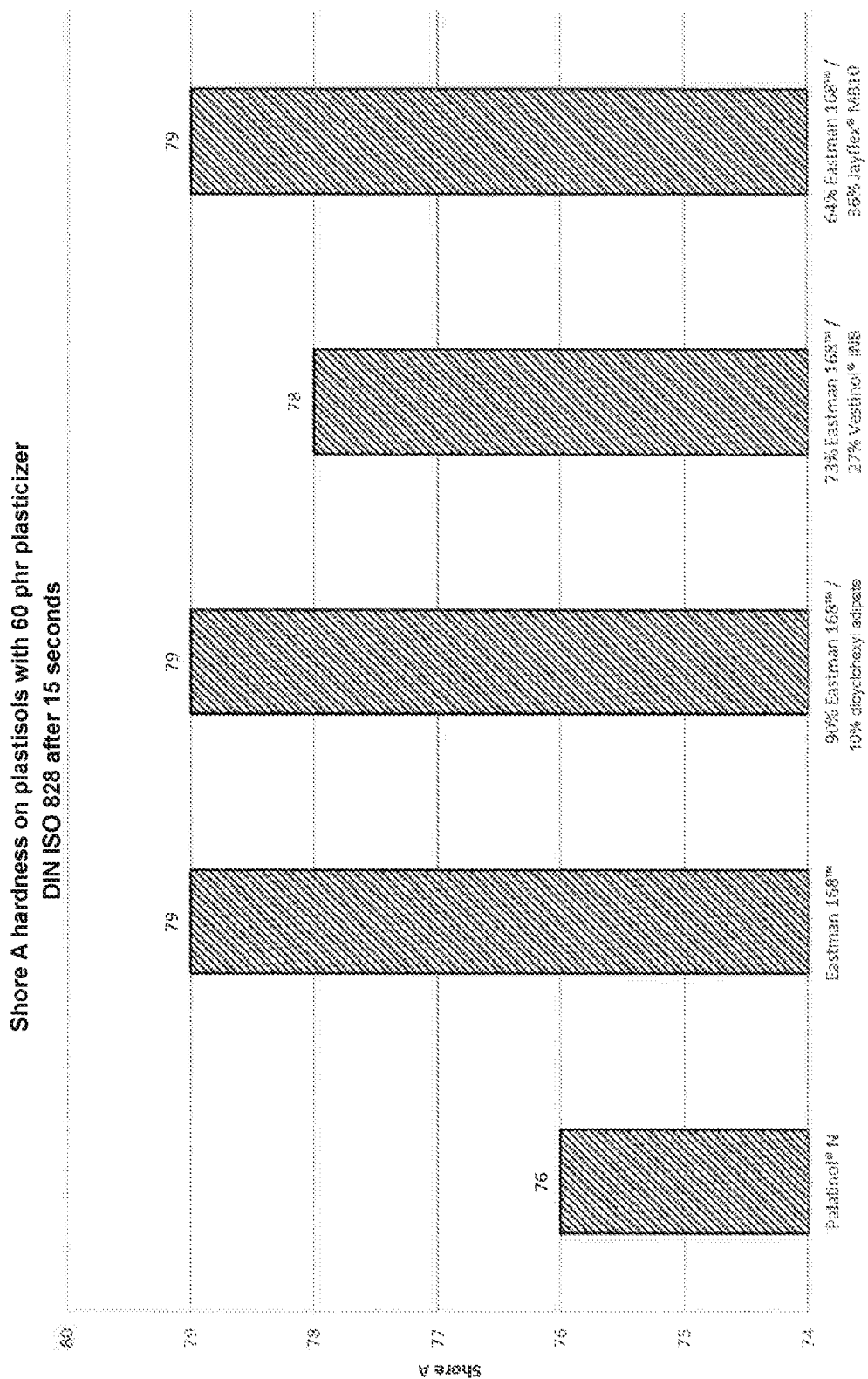

FIG. 9 shows the Shore A hardness of PVC foils produced from PVC plastisols containing 60 phr of the inventively employed plasticizer composition and various blends of Eastman 168™ with the commercially available gelling assistants Vestinol® INB or Jayflex® MB 10. Plotted additionally is the Shore A hardness of foils produced from PVC plastisols containing exclusively the commercially available plasticizers Eastman 168™ or Palatinol® N.

Figure 10:
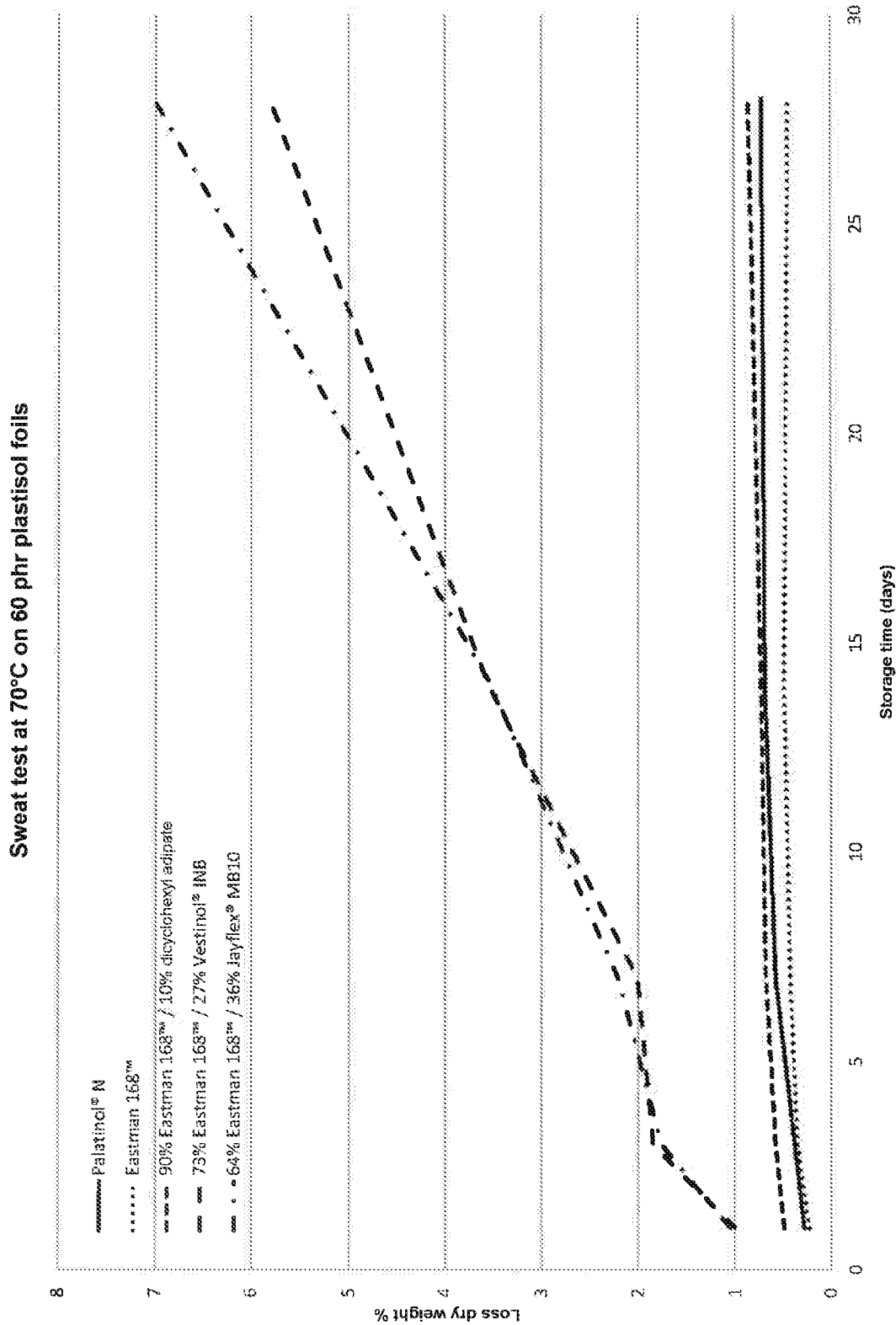

FIG. 10 shows the compatibility of PVC foils produced from plastisols containing 60 phr of the inventively employed plasticizer composition and various blends of Eastman 168™ with the commercially available fast fusers Vestinol® INB or Jayflex® MB 10. Plotted additionally is the compatibility of foils produced from PVC plastisols containing exclusively the commercially available plasticizer Eastman 168™ or Palatinol® N. The plot is of the loss of dry weight [%] as a function of the storage time [d].

DESCRIPTION OF THE INVENTION

The plasticizer compositions of the invention have the following advantages:

The plasticizer compositions of the invention are notable for high compatibility with the polymers to be plasticized, more particularly PVC.

The plasticizer compositions of the invention have high permanence. The plasticizer compositions of the invention hence display low volatility both in processing and during the service of the end products.

The plasticizer compositions of the invention are suitable advantageously for the attainment of a multiplicity of very different and complex processing properties and performance properties of plastics.

The plasticizer composition of the invention is suitable advantageously for producing plastisols.

The compounds (I) present in the plasticizer composition of the invention are very highly suitable as fast fusers on account of their extremely low solvation temperatures in accordance with DIN 53408 (July 1967). To reduce the temperature needed for the gelling of a thermoplastic polymer and/or to increase the rate of gelling thereof, just small quantities of the compounds (I) in the plasticizer composition of the invention are enough.

The plasticizer compositions of the invention are suitable for use for the production of moldings and foils for sensitive areas of application, such as medical products, food packaging, products for the interior sector, of dwellings and vehicles, for example, toys, childcare articles, etc.

The compounds (I) present in the plasticizer compositions of the invention can be produced using readily available starting materials.

The processes for the preparation of the compounds (I) used in accordance with the invention are simple and efficient, allowing them to be provided readily on an industrial scale.

As mentioned above it has surprisingly been ascertained that the compounds of the general formula (I) present in the plasticizer compositions used in accordance with the invention have very low DIN 53408 solvation temperatures and as a result are especially suitable in combination with diesters of the general formula (II), in particular with 1,2-cyclohexanedicarboxylic esters of the general formula (II.a) and/or with terephthalic diesters of the general formula (II.b), for improving the gelling performance of thermoplastic polymers and elastomers. Even relatively small amounts of the compounds (I) are sufficient in the plasticizer composition of the invention to lower the required gelling temperature and/or to increase the gelling rate.

In combination with compounds of the general formula (I) it is possible to use either compounds of the formulae (II.a) or (II.b).

In combination with compounds of the general formula (I) it is also possible to use a mixture of compounds of the formulae (II.a) and (II.b).

For the purposes of the present invention, a "fast fuser" is a fast-gelling plasticizer having a DIN 53408 solvation temperature of below 120° C. Fast fusers of this kind are used particularly for producing plastisols.

For the purposes of the present invention, the abbreviation phr (parts per hundred resin) used above or below stands for parts by weight of plasticizer per hundred parts by weight of polymer.

For the purposes of the invention, the prefix $C_n$-$C_m$ indicates the number of carbon atoms which a molecule or a radical thus identified can have.

The expression "$C_5$-$C_7$ cycloalkyl" in the sense of the present invention comprises saturated cyclic hydrocarbons having 5, 6 or 7 carbon atoms. These include, for example, cyclopentyl, cyclohexyl, and cycloheptyl. Particularly preferred is cyclohexyl.

Substituted $C_5$-$C_7$ cycloalkyl groups may, depending on their ring size, have one or more (e.g., 1, 2, 3, 4 or 5) $C_1$-$C_{10}$ alkyl substituents. In this case the $C_1$-$C_{10}$ alkyl substituents are each independently of one another selected from straight-chain and branched $C_1$-$C_{10}$ alkyl groups, examples being ethyl, methyl, n-propyl, isopropyl, n-butyl, isobutyl, sec-butyl, tert-butyl, n-pentyl, n-hexyl, n-heptyl, n-octyl, n-nonyl, n-decyl, and the structural isomers thereof.

Examples of substituted $C_5$-$C_7$ cycloalkyl groups are 2-methylcyclopentyl, 3-methylcyclopentyl, 2-methylcyclohexyl, 3-methylcyclohexyl, 4-methylcyclohexyl, 2-methylcycloheptyl, 3-methylcycloheptyl, 4-methylcycloheptyl, 2-ethylcyclopentyl, 3-ethylcyclopentyl, 2-ethylcyclohexyl, 3-ethylcyclohexyl, 4-ethylcyclohexyl, 2-ethylcycloheptyl, 3-ethylcycloheptyl, 4-ethylcycloheptyl. Preferred are 2-methylcyclopentyl, 2-methylcyclohexyl and 2-methylcycloheptyl.

For the purposes of the present invention, the expression "$C_4$-$C_{12}$ alkyl" comprises unbranched or branched alkyl groups having 4 to 12 carbon atoms. These include, for example, n-butyl, isobutyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethyl-propyl, n-hexyl, 1-methylpentyl, 2-methylpentyl, 1-ethylbutyl, 2-ethylbutyl, n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl, n-dodecyl, isododecyl, and the structural isomers thereof.

"$C_4$-$C_{12}$ Alkyl" preferably comprises branched or unbranched $C_7$-$C_{12}$ alkyl groups. Preferably $C_7$-$C_{12}$ alkyl is selected from n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl, n-dodecyl, isododecyl and the like. Preferably "$C_7$-$C_{12}$ alkyl" comprises branched or unbranched $C_7$-$C_{12}$ alkyl groups, more particularly branched or unbranched $C_8$-$C_{11}$ alkyl groups. With particular preference $C_8$-$C_{11}$ alkyl is n-octyl, n-nonyl, isononyl, 2-ethylhexyl, isodecyl, 2-propylheptyl, n-undecyl or isoundecyl.

For the purposes of the present invention, the expression "$C_1$-$C_{10}$ alkyl" comprises straight-chain and branched $C_1$-$C_{10}$ alkyl groups, examples being methyl, ethyl, propyl, butyl, pentyl, hexyl, heptyl, octyl, nonyl, and decyl.

For the purposes of the present invention, the expression "unbranched $C_2$-$C_8$ alkylene group" refers to unbranched, divalent hydrocarbon radicals having 2 to 8 carbon atoms. These include, for example, 1,2-ethylene, 1,2-propylene, 1,3-propylene, 1,4-butylene, 1,5-pentylene, 1,6-hexylene, 1,7-heptylene, and 1,8-octylene.

The unbranched $C_2$-$C_8$ alkylene group preferably comprises unbranched $C_2$-$C_5$ alkylene groups, examples being 1,2-ethylene, 1,3-propylene, 1,4-butylene, and 1,5-pentylene.

For the purposes of the present invention, the expression "branched $C_6$-$C_8$ alkylene group" refers to branched, divalent hydrocarbon radicals having 6 to 8 carbon atoms. These include, for example, 2-methyl-1,5-pentylene, 3-methyl-1,5-pentylene, 2,3-dimethyl-1,4-butylene, 2-methyl-1,6-hexylene, 3-methyl-1,6-hexylene, 2-ethyl-1,5-pentylene, 3-ethyl-1,5-pentylene, 2,3-dimethyl-1,5-pentylene, 2,4-dimethyl-1,5-pentylene, 2-methyl-1,7-heptylene, 3-methyl-1,7-heptylene, 4-methyl-1,7-heptylene, 2-ethyl-1,6-hexylene, 3-ethyl-1,6-hexylene, 2,3-dimethyl-1,6-hexylene, 2,4-dimethyl-1,6-hexylene, and the like.

For the purposes of the present invention, the "$C_2$-$C_8$ alkenylene group" comprises divalent hydrocarbon radicals having 2 to 8 carbon atoms, which may be unbranched or branched, with the main chain having at least one double bond.

The "$C_2$-$C_8$ alkenylene group" preferably comprises branched and unbranched $C_2$-$C_6$ alkenylene groups having one double bond. These include, for example, ethenylene, propenylene, 1-methylethenylene, 1-butenylene, 2-butenylene, 1-methylpropenylene, 2-methylpropenylene, 1-pentenylene, 2-pentenylene, 1-methyl-1-butenylene, 1-methyl-2-butenylene, 1-hexenylene, 2-hexenylene, 3-hexenylene, 1-methyl-1-pentenylene, 1-methyl-2-pentenylene, 1-methyl-3-pentenylene, 1,4-dimethyl-1-butenylene, 1,4-dimethyl-2-butenylene, and the like. With particular preference the "$C_2$-$C_8$ alkenylene group" comprises unbranched $C_2$-$C_4$ alkenylene groups having one double bond.

The double bonds in the alkenylene groups may independently of one another be present in the E- or Z-configuration or as a mixture of both configurations.

The singly or multiply branched alkylene groups and alkenylene groups may have an R or S configuration, or both configurations, in equal or different proportions, for the carbon atom at the branching point or for the carbon atoms at the respective branching points, independently of one another.

Compounds of the Formula (I)

The radicals $R^1$ and $R^2$ in the general formula (I) independently of one another preferably are cyclopentyl, cyclohexyl, cycloheptyl, 2-methylcyclopentyl, 2-methylcyclohexyl, and 2-methylcycloheptyl, and more preferably are cyclopentyl, cyclohexyl, and cycloheptyl. With particular preference the radicals $R^1$ and $R^2$ are identical. With very particular preference the radicals $R^1$ and $R^2$ in the general formula (I) are both cyclohexyl.

In the compounds of the general formula (I), X is preferably an unbranched $C_2$-$C_5$ alkylene group or an unbranched $C_2$-$C_4$ alkenylene group with a double bond.

With particular preference, in the compounds of the general formula (I), X is an unbranched $C_2$-$C_5$ alkylene group, examples being 1,2-ethylene, 1,3-propylene, 1,4-butylene, and 1,5-pentylene. More particularly X is 1,3-propylene or 1,4-butylene.

Preferred compounds of the general formula (I) are selected from
di(cyclopentyl) glutarate,
di(cyclohexyl) glutarate,
di(cycloheptyl) glutarate,
di(2-methylcyclopentyl) glutarate,
di(2-methylcyclohexyl) glutarate,
di(2-methylcycloheptyl) glutarate,
di(cyclopentyl) adipate,
di(cyclohexyl) adipate,
di(cycloheptyl) adipate,
di(2-methylcyclopentyl) adipate,
di(2-methylcyclohexyl) adipate,
di(2-methylcycloheptyl) adipate,
and also mixtures of two or more than two of the above-stated compounds.

One particularly preferred compound of the general formula (I) is dicyclohexyl adipate.

Compounds of the General Formula (II)

In the compounds of the general formula (II), Y is selected from the groups of the formula (Y.a) and (Y.b)

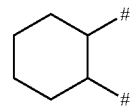

(Y.a)

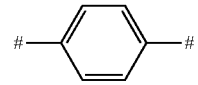

(Y.b)

where # represents the respective points of attachment to the ester groups.

In one preferred version, in the compounds of the general formulae (II), (II.a), and (II.b), the radicals $R^3$ and $R^4$ independently of one another are $C_7$-$C_{12}$-alkyl, as for example n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl, n-dodecyl, isododecyl or the like. With particular preference $R^3$ and $R^4$ independently of one another are n-octyl, n-nonyl, isononyl, 2-ethylhexyl, isodecyl, 2-propylheptyl, n-undecyl or isoundecyl.

In one preferred embodiment, in the compounds of the general formula (II), the radicals $R^3$ and $R^4$ are identical.

With preference in the compounds of the general formula (II), the radicals $R^3$ and $R^4$ are both $C_7$-$C_{12}$ alkyl, more preferably are both 2-ethylhexyl, are both isononyl or are both 2-propylheptyl.

Compounds of the General Formula (II.a)

In one preferred version, in the compounds of the formula (II.a), the radicals $R^3$ and $R^4$ independently of one another are $C_7$-$C_{12}$ alkyl, preferably independently of one another n-octyl, n-nonyl, isononyl, 2-ethylhexyl, isodecyl, 2-propylheptyl, n-undecyl or isoundecyl, more preferably 2-ethylhexyl, isononyl or 2-propylheptyl, more particularly isononyl.

In another preferred version, in the compounds of the formula (II.a), the radicals $R^3$ and $R^4$ have the same definition.

Preferably, in the compounds of the formula (II.a), the radicals $R^3$ and $R^4$ are both $C_7$-$C_{12}$ alkyl, more preferably both 2-ethylhexyl, both isononyl or both 2-propylheptyl, and more particularly are isononyl.

One particularly preferred compound of the formula (II) is di(isononyl) 1,2-cyclohexane-dicarboxylate.

Compounds of the General Formula (II.b)

In one preferred version, in the compounds of the formula (II.b), the radicals $R^3$ and $R^4$ independently of one another are $C_7$-$C_{12}$ alkyl, more preferably independently of one another n-octyl, n-nonyl, isononyl, 2-ethylhexyl, isodecyl, 2-propylheptyl, n-undecyl or isoundecyl, more preferably 2-ethylhexyl, isononyl or 2-propylheptyl, more particularly 2-ethylhexyl.

In one preferred embodiment, in the compounds of the formula (II.b), the radicals $R^3$ and $R^4$ are identical.

Preferably, in the compounds of the formula (II.b), the radicals $R^3$ and $R^4$ are both $C_7$-$C_{12}$ alkyl, more preferably both 2-ethylhexyl, both isononyl or both 2-propylheptyl, and more particularly are 2-ethylhexyl.

One particularly preferred compound of the formula (II.b) is di(2-ethylhexyl) terephthalate.

Particular Embodiments

Through adaptation of the proportions of the compounds (I) and (II) in the plasticizer composition of the invention, the plasticizer properties may be tailored to the corresponding end use. For use in specific areas of application, it may optionally be useful to add further plasticizers, different from the compounds (I), (I.a), and (II), to the plasticizer composition of the invention. For this reason, the plasticizer composition of the invention may optionally comprise at least one further plasticizer, different from the compounds (I) and (II).

The additional plasticizer different from the compounds (I), (I.a), and (II) is selected from phthalic dialkyl esters, phthalic alkyl aralkyl esters, trimellitic trialkyl esters, esters of 1,2-cyclohexanedicarboxylic acids, other than compounds (II), terephthalic dialkyl esters, other than compounds (II), 1,3- and 1,4-cyclohexanedicarboxylic alkyl esters, esters of cyclohexanedicarboxylic acids, other than compounds (II), benzoic alkyl esters, dibenzoic esters of glycols, hydroxybenzoic esters, esters of saturated monocarboxylic acids, esters of saturated and unsaturated dicarboxylic acids, other than compounds (I) and (I.a), amides and esters of aromatic sulfonic acids, alkylsulfonic esters, glycerol esters, isosorbide esters, phosphoric esters, citric triesters, alkylpyrrolidone derivatives, 2,5-furandicarboxylic alkyl esters, 2,5-tetrahydrofurandicarboxylic alkyl esters, epoxidized vegetable oils, epoxidized fatty acid monoalkyl esters, and polyesters of aliphatic and/or aromatic polycarboxylic acids with at least dihydric alcohols.

Preferred dialkyl phthalates which may be mixed advantageously with the compounds (I) and (II) independently of one another have 4 to 13 C atoms, preferably 8 to 13 C atoms, in the alkyl chains. A suitable phthalic alkyl aralkyl ester is benzyl butyl phthalate, for example. Suitable trimellitic trialkyl esters preferably have, independently of one another, in each case 4 to 13 C atoms, more particularly 7 to 11 C atoms, in the alkyl chains. Suitable benzoic alkyl esters preferably have, independently of one another, in each case 7 to 13 C atoms, more particularly 9 to 13 C atoms, in the alkyl chains. Suitable benzoic alkyl esters are, for example, isononyl benzoate, isodecyl benzoate, or 2-propylheptyl benzoate. Suitable dibenzoic esters of glycols are diethylene glycol dibenzoate and dibutylene glycol dibenzoate. Suitable esters of saturated monocarboxylic acids are, for example, esters of acetic acid, butyric acid, valeric acid or lactic acid. Suitable esters of saturated dicarboxylic acids, different from the compounds of the formula (I) and (I.a), are, for example, esters of succinic acid, azelaic acid and sebacic acid. Suitable esters of unsaturated dicarboxylic acids, different from the compounds of the formula (I) and (I.a), are, for example, esters of maleic acid and of fumaric acid having 6 to 13 C atoms in the alkyl radicals. Suitable alkylsulfonic esters preferably have an alkyl radical with 8 to 22 C atoms. They include, for example, the phenyl or cresyl ester of pentadecylsulfonic acid. Suitable isosorbide esters are isosorbide diesters, which are preferably esterified with $C_8$-$C_{13}$ carboxylic acids. Suitable phosphoric esters are tri-2-ethylhexyl phosphate, trioctyl phosphate, triphenyl phosphate, isodecyl diphenyl phosphate, bis(2-ethylhexyl) phenyl phosphate, and 2-ethylhexyl diphenyl phosphate. In the citric triesters, the OH group may be present in free or carboxylated form, preferably acetylated. The alkyl radicals of the acetylated citric triesters preferably independently of one another have 4 to 8 C atoms, more particularly 6 to 8 C atoms. Alkylpyrrolidone derivatives having alkyl radicals of 4 to 18 C atoms are suitable. Suitable 2,5-furandicarboxylic dialkyl esters have, independently of one another, in each case 7 to 13 C atoms, preferably 8 to 12 C atoms, in the alkyl chains. Suitable 2,5-tetrahydrofurandicarboxylic dialkyl esters have, independently of one another, in each case 7 to 13 C atoms, preferably 8 to 12 C atoms, in the alkyl chains. A suitable epoxidized vegetable oil is, for example, epoxidized soybean oil, available, for example, from Galata-Chemicals, Lampertheim, Germany. Epoxidized fatty acid monoalkyl esters, available, for example, under the trade name reFlex™ from PolyOne, USA, are also suitable. The polyesters of aliphatic and aromatic polycarboxylic acids are preferably polyesters of adipic acid with polyhydric alcohols, more particularly dialkylene glycol polyadipates having 2 to 6 carbon atoms in the alkylene radical.

In all of the cases stated above, the alkyl radicals may in each case be linear or branched and in each case identical or different. Reference is made to the general observations given at the outset regarding suitable and preferred alkyl radicals.

The amount of the at least one further plasticizer, different from the compounds (I) and (II), in the plasticizer composition of the invention is typically 0 to 50 wt %, preferably 0 to 40 wt %, more preferably 0 to 30 wt %, and more particularly 0 to 25 wt %, based on the total amount of the at least one further plasticizer and of the compounds (I) and (II) in the plasticizer composition.

If a further plasticizer is present, its concentration is then preferably at least 0.01 wt %, more preferably at least 0.1 wt %, based on the total amount of the at least one further plasticizer and of the compounds (I) and (II) in the plasticizer composition.

In one preferred embodiment the plasticizer composition of the invention comprises no further plasticizer different from the compounds (I) and (II).

The amount of compounds of the general formula (I) in the plasticizer composition of the invention is preferably 1 to 70 wt %, more preferably 2 to 50 wt %, and more particularly 3 to 30 wt %, based on the total amount of the compounds (I) and (II) in the plasticizer composition.

The amount of compounds of the general formula (II) in the plasticizer composition of the invention is preferably 30 to 99 wt %, more preferably 50 to 98 wt %, and more particularly 70 to 97 wt %, based on the total amount of the compounds (I) and (II) in the plasticizer composition.

In the plasticizer composition of the invention, the weight ratio between compounds of the general formula (I) and compounds of the general formula (II) is preferably in the range from 1:100 to 2:1, more preferably in the range from 1:50 to 1:1, and especially in the range from 1:35 to 1:2.

Molding Compositions

A further subject of the present invention relates to a molding composition comprising at least one polymer and a plasticizer composition as defined above.

In one preferred embodiment, the polymer present in the molding composition comprises a thermoplastic polymer.

Thermoplastic polymers that are suitable include all polymers which can be processed thermoplastically. More particularly these thermoplastic polymers are selected from:

homopolymers or copolymers comprising in copolymerized form at least one monomer selected from $C_2$-$C_{10}$ monoolefins, such as, for example, ethylene or propylene, 1,3-butadiene, 2-chloro-1,3-butadiene, vinyl alcohol and its $C_2$-$C_{10}$ alkyl esters, vinyl chloride, vinylidene chloride, vinylidene fluoride, tetrafluoroethylene, glycidyl acrylate, glycidyl methacrylate, acrylates and methacrylates with alcohol components from branched and unbranched $C_1$-$C_{10}$ alcohols, vinylaromatics such as, for example, styrene, acrylonitrile, methacrylonitrile, α,β-ethylenically unsaturated monocarboxylic and dicarboxylic acids, and maleic anhydride;

homopolymers and copolymers of vinyl acetals;

polyvinyl esters;

polycarbonates (PC);

polyesters, such as polyalkylene terephthalates, polyhydroxyalkenoates (PHA), polybutylenesuccinates (PBS), polybutylenesuccinate adipates (PBSA);

polyethers;

polyetherketones;

thermoplastic polyurethanes (TPU);

polysulfides;

polysulfones;

polyethersulfones;

cellulose alkyl esters;

and mixtures thereof.

Examples include polyacrylates with identical or different alcohol residues from the group of the $C_4$-$C_8$ alcohols, particularly those of butanol, hexanol, octanol, and 2-ethylhexanol, polymethyl methacrylate (PMMA), methyl methacrylate-butyl acrylate copolymers, acrylonitrile-butadiene-styrene copolymers (ABS), ethylene-propylene copolymers, ethylene-propylene-diene copolymers (EPDM), polystyrene (PS), styrene-acrylonitrile copolymers (SAN), acrylonitrile-styrene-acrylate (ASA), styrene-butadiene-methyl methacrylate copolymers (SBMMA), styrene-maleic anhydride copolymers, styrene-methacrylic acid copolymers (SMA), polyoxymethylene (POM), polyvinyl alcohol (PVAL), polyvinyl acetate (PVA), polyvinyl butyral (PVB), polycaprolactone (PCL), polyhydroxybutyric acid (PHB), polyhydroxyvaleric acid (PHV), polylactic acid (PLA), ethylcellulose (EC), cellulose acetate (CA), cellulose propionate (CP), or cellulose acetate/butyrate (CAB).

The at least one thermoplastic polymer present in the molding composition of the invention preferably comprises polyvinyl chloride (PVC), polyvinyl butyral (PVB), homopolymers and copolymers of vinyl acetate, homopolymers and copolymers of styrene, polyacrylates, thermoplastic polyurethanes (TPU), or polysulfides.

Depending on which thermoplastic polymer or thermoplastic polymer mixture is present in the molding composition, different amounts of plasticizer are used. The total amount of plasticizer in the molding composition is generally 0.5 to 300 phr (parts per hundred resin, i.e., parts by weight per hundred parts by weight of polymer), preferably 0.5 to 130 phr, more preferably 1 to 100 phr.

The at least one thermoplastic polymer present in the molding composition of the invention is especially polyvinyl chloride (PVC).

Polyvinyl chloride is obtained by homopolymerization of vinyl chloride. The polyvinyl chloride (PVC) used in accordance with the invention may be prepared, for example, by suspension polymerization, microsuspension polymerization, emulsion polymerization, or bulk polymerization. The preparation of PVC by polymerization of vinyl chloride, and production and composition of plasticized PVC, are described in, for example, "Becker/Braun, Kunststoff-Handbuch, volume 2/1: Polyvinylchlorid", $2^{nd}$ edition, Carl Hanser Verlag, Munich.

For the PVC plasticized in accordance with the invention, the K value, which characterizes the molar mass of the PVC and is determined according to DIN EN ISO 1628-2 (November 1999), is usually between 57 and 90, preferably between 61 and 85, more particularly between 64 and 80.

For the purposes of the invention, the amount of PVC in the molding compositions of the invention is 20 to 95 wt %, preferably 40 to 90 wt %, and more particularly 45 to 85 wt %.

Where the thermoplastic polymer in the molding compositions of the invention is polyvinyl chloride, the total amount of plasticizer in the molding composition is 1 to 300 phr, preferably 5 to 150 phr, more preferably 10 to 130 phr, and more particularly 15 to 120 phr.

A further subject of the present invention relates to molding compositions comprising at least one elastomer and at least one plasticizer composition as defined above.

The elastomer present in the molding compositions of the invention is preferably at least one natural rubber (NR), or at least one synthetically produced rubber, or mixtures thereof. Examples of preferred rubbers produced synthetically are polyisoprene rubber (IR), styrene-butadiene rubber (SBR), butadiene rubber (BR), nitrile-butadiene rubber (NBR), or chloroprene rubber (CR).

Preferred rubbers or rubber mixtures are those which can be vulcanized with sulfur.

For the purposes of the invention, the amount of elastomer in the molding compositions of the invention is 20% to 95 wt %, preferably 45% to 90 wt %, and more particularly 50% to 85 wt %.

For the purposes of the invention, the molding compositions which comprise at least one elastomer may comprise other suitable adjuvants, in addition to the ingredients above. For example, there may be reinforcing fillers present, such as carbon black or silicon dioxide, further fillers, a methylene donor, such as hexamethylenetetramine (HMT), a methylene acceptor, such as phenolic resins modified with cardanol (from cashew nuts), a vulcanizing or crosslinking agent, a vulcanizing or crosslinking accelerator, activators, various types of oil, aging inhibitors, and other various adjuvants which are incorporated, for example, into tire compounds and other rubber compounds.

Where the polymer in the molding compositions of the invention comprises rubbers, the amount of the plasticizer composition of the invention, as defined above, in the molding composition is 1 to 60 phr, preferably 1 to 40 phr, more preferably 2 to 30 phr, Molding Composition Adjuvants For the purposes of the invention, the molding compositions comprising at least one thermoplastic polymer may comprise other suitable adjuvants. Examples that may be present include stabilizers, lubricants, fillers, pigments, flame retardants, light stabilizers, blowing agents, polymeric processing assistants, impact tougheners, optical brighteners, antistats, or biostabilizers.

A number of suitable adjuvants are described in more detail below. The examples given, however, do not impose any restriction on the molding compositions of the invention, but instead serve merely for elucidation. All amount details are in wt % figures, based on the molding composition as a whole.

Stabilizers contemplated include all customary PVC stabilizers in solid and liquid form, examples being customary Ca/Zn, Ba/Zn, Pb or Sn stabilizers, and also acid-binding phyllosilicates, such as hydrotalcite.

The molding compositions of the invention may have a stabilizer content of 0.05% to 7%, preferably 0.1% to 5%, more preferably of 0.2% to 4%, and more particularly of 0.5% to 3%.

Lubricants reduce the adhesion between the plastics to be processed and metal surfaces and serve to counteract frictional forces during mixing, plastifying, and deforming.

The molding compositions of the invention may comprise, as lubricants, all lubricants customary for the processing of plastics. Those contemplated include, for example, hydrocarbons, such as oils, paraffins, and PE waxes, fatty alcohols having 6 to 20 carbon atoms, ketones, carboxylic acids, such as fatty acids and montanic acid, oxidized PE wax, metal salts of carboxylic acids, carboxamides, and also carboxylic esters, examples being those with the alcohols ethanol, fatty alcohols, glycerol, ethanediol, pentaerythritol, and long-chain carboxylic acids as acid component.

The molding compositions of the invention may have a lubricant content of 0.01% to 10%, preferably 0.05% to 5%, more preferably of 0.1% to 3%, and more particularly of 0.2% to 2%.

Fillers influence in particular the compressive strength, tensile strength, and flexural strength, and also the hardness and heat distortion resistance, of plasticized PVC in a positive way.

For the purposes of the invention, the molding compositions may also comprise fillers, such as, for example, carbon black and other inorganic fillers, such as natural calcium carbonates, as for example chalk, limestone, and marble, synthetic calcium carbonates, dolomite, silicates, silica, sand, diatomaceous earth, aluminum silicates, such as kaolin, mica, and feldspar. Preferred fillers used are calcium carbonates, chalk, dolomite, kaolin, silicates, talc, or carbon black.

The molding compositions of the invention may have a filler content of 0.01% to 80%, preferably 0.1 to 60%, more preferably of 0.5 to 50%, and more particularly of 1% to 40%.

The molding compositions of the invention may also comprise pigments, in order to adapt the resulting product to different possible applications.

For the purposes of the present invention, both inorganic pigments and organic pigments may be used. Inorganic pigments used may be, for example, cobalt pigments, such as $CoO/Al_2O_3$, and chromium pigments, as for example $Cr_2O_3$. Organic pigments contemplated include, for example, monoazo pigments, condensed azo pigments, azomethine pigments, anthraquinone pigments, quinacridones, phthalocyanine pigments, dioxazine pigments, and diketopyrrolopyrrole pigments.

The molding compositions of the invention may have a pigment content of 0.01% to 10%, preferably 0.05% to 5%, more preferably of 0.1% to 3%, and more particularly of 0.5% to 2%.

In order to reduce flammability and to reduce the level of smoke given off on burning, the molding compositions of the invention may also comprise flame retardants.

Examples of flame retardants which can be used include antimony trioxide, phosphate esters, chlorinated paraffin, aluminum hydroxide or boron compounds.

The molding compositions of the invention may have a flame retardant content of 0.01% to 10%, preferably 0.1% to 8%, more preferably of 0.2% to 5%, and more particularly of 0.5% to 2%.

In order to protect articles produced from the molding compositions of the invention from surface-region damage due to the influence of light, the molding compositions may also comprise light stabilizers: for example, UV absorbers.

For the purposes of the present invention it is possible to use hydroxybenzophenones, hydroxyphenylbenzotriazoles, cyanoacrylates or what are known as hindered amine light stabilizers (HALS), such as the derivatives of 2,2,6,6-tetramethylpiperidine, for example, as light stabilizers.

The molding compositions of the invention may have a light stabilizer, for example UV absorber, content of 0.01% to 7%, preferably 0.1% to 5%, more preferably of 0.2% to 4%, and more particularly of 0.5% to 3%.

Plastisols

A further subject of the invention relates to a plastisol comprising a plasticizer composition as defined above.

Plastisols for the purposes of this invention comprise a suspension of finely pulverulent plastics in the liquid plasticizer composition of the invention. Suitable plastics are the polymers stated above, especially thermoplastic polymers. For suitable and preferred polymers, reference is made here in full to those identified in the section on molding compositions.

The plastisols are typically present in liquid form. With certain conditions, the plastisols undergo irreversible gelling.

Preferred plastisols comprise PVC as polymer. One specific version are plastisols which comprise PVC as their sole polymer component.

Preparation of the Compounds of the General Formula (I)

Described below is the preparation of the compounds of the general formula (I) present in the plasticizer compositions of the invention.

Esterification

The ester compounds of the general formula (I) can be prepared by esterification of corresponding aliphatic dicarboxylic acids with the corresponding aliphatic alcohols according to customary methods known to the skilled person. These include the reaction of at least one alcohol component, selected from the alcohols $R^1$—OH and/or $R^2$—OH, with a dicarboxylic acid of the general formula HO—C(=O)—X—C(=O)—OH or a suitable derivative thereof. Examples of suitable derivatives are the acyl halides and acid anhydrides. One preferred acyl halide is the acyl chloride. Esterification catalysts used may be the catalysts customary for that purpose, examples being mineral acids, such as sulfuric acid and phosphoric acid; organic sulfonic acids, such as methanesulfonic acid and p-toluenesulfonic acid; amphoteric catalysts, more particularly compounds of titanium, tin(IV) compounds, or zirconium compounds, such as tetraalkoxytitaniums, e.g., tetrabutoxytitanium, and tin (IV) oxide. The water formed in the reaction can be removed by customary measures, such as by distillation, for example. WO 02/38531 describes a process for preparing esters of polybasic carboxylic acids by a) heating to boiling, in a reaction zone, a mixture consisting essentially of the acid component or an anhydride thereof and of the alcohol component, in the presence of an esterifying catalyst, b) separating the alcohol and water containing vapors by rectification into an alcohol-rich fraction and a water-rich fraction, c) returning the alcohol-rich fraction to the reaction zone, and discharging the water-rich fraction from the process. The process described in WO 02/38531 and also the catalysts disclosed therein are likewise suitable for the esterification.

The esterification catalyst is used in an effective amount, which is typically in the range from 0.05 to 10 wt %, preferably 0.1 to 5 wt %, based on the sum of acid component (or anhydride) and alcohol component.

Further suitable methods for preparing the compounds of the general formula (I) by means of esterification are described in, for example, U.S. Pat. Nos. 6,310,235, 5,324,853, DE-A 2612355 (Derwent Abstract No. DW 77-72638 Y) or DE-A 1945359 (Derwent Abstract No. DW 73-27151 U). The documents cited are hereby referenced in full.

In general the esterification of the dicarboxylic acid HO—C(=O)—X—C(=O)—OH takes place in the presence of the above-described alcohol components $R^1$—OH and/or $R^2$—OH by means of an organic acid or mineral acid, more particularly concentrated sulfuric acid. The alcohol component here is used advantageously in at least twice the stoichiometric amount, based on the amount of dicarboxylic acid HO—C(=O)—X—C(=O)—OH or a suitable derivative thereof in the reaction mixture.

The esterification may take place in general at ambient pressure or under reduced or elevated pressure. The esterification is preferably conducted at ambient pressure or reduced pressure.

The esterification can be carried out in the absence of an added solvent, or in the presence of an organic solvent.

If the esterification is carried out in the presence of a solvent, the solvent in question is preferably an organic solvent which is inert under the reaction conditions. Such solvents include, for example, aliphatic hydrocarbons, halogenated aliphatic hydrocarbons, aromatic and substituted aromatic hydrocarbons, or ethers. The solvent is selected preferably from pentane, hexane, heptanes, ligroin, petroleum ether, cyclohexane, dichloromethane, trichloromethane, carbon tetrachloride, benzene, toluene, xylene, chlorobenzene, dichlorobenzenes, dibutyl ether, THF, dioxane, and mixtures thereof.

The esterification is carried out customarily within a temperature range from 50 to 250° C. Where the esterification catalyst is selected from organic acids or mineral acids, the esterification is conducted typically in a temperature range from 50 to 160° C. Where the esterification catalyst is selected from amphoteric catalysts, the esterification is carried out customarily within a temperature range from 100 to 250° C.

The esterification may take place in the presence or absence of an inert gas. An inert gas, generally speaking, is a gas which under the existing reaction conditions does not enter into any reactions with reactants participating in the reaction, or with reagents, or with solvents, or with the products formed.

Transesterification

Conventional processes known to the person skilled in the art can be used for the production of the ester compounds of the general formula (I) by transesterification of esters, which differ from the esters of the general formula (I), with the corresponding aliphatic alcohols. They include the reaction of the di($C_1$-$C_2$)-alkyl esters of the dicarboxylic acids HO—C(=O)—X—C(=O)—OH with at least one alcohol $R^1$—OH and/or $R^2$—OH, or mixtures thereof, in the presence of a suitable transesterification catalyst.

Transesterification catalysts that can be used are the conventional catalysts usually used for transesterification reactions, and mostly also used in esterification reactions. Among these are by way of example mineral acids, such as sulfuric acid and phosphoric acid; organic sulfonic acids, such as methanesulfonic acid and p-toluenesulfonic acid; and specific metal catalysts from the group of the tin(IV) catalysts, for example dialkyltin dicarboxylates, such as dibutyltin diacetate, trialkyltin alkoxides, monoalkyltin compounds, such as monobutyltin dioxide, tin salts, such as tin acetate, or tin oxides; from the group of the titanium catalysts: monomeric and polymeric titanates and titanium chelates, for example tetraethyl orthotitanate, tetrapropyl orthotitanate, tetrabutyl orthotitanate, triethanolamine titanate; from the group of the zirconium catalysts: zirconates and zirconium chelates, for example tetrapropyl zirconate, tetrabutyl zirconate, triethanolamine zirconate; and also lithium catalysts, such as lithium salts, lithium alkoxides; and aluminum(III) acetylacetonate, chromium(III) acetylacetonate, iron(III) acetylacetonate, cobalt(II) acetylacetonate, nickel(II) acetylacetonate, and zinc(II) acetylacetonate.

The amount of transesterification catalyst used is from 0.05 to 5% by weight, preferably from 0.1 to 1% by weight. The reaction mixture is preferably heated to the boiling point of the reaction mixture, the reaction temperature therefore being from 20° C. to 200° C., depending on the reactants.

The transesterification can take place at ambient pressure or at reduced or elevated pressure. It is preferable that the transesterification is carried out at a pressure of from 0.001 to 200 bar, particularly from 0.01 to 5 bar. The relatively low-boiling-point alcohol eliminated during the transesterification is preferably continuously removed by distillation in order to shift the equilibrium of the transesterification reaction. The distillation column necessary for this purpose generally has direct connection to the transesterification reactor, and it is preferable that said column has a direct attachment thereto. If a plurality of transesterification reactors are used in series, each of said reactors can have a distillation column, or the vaporized alcohol mixture can preferably be introduced into a distillation column from the final tanks of the transesterification reactor cascade by way of one or more collection lines. The relatively high-boiling-point alcohol reclaimed in said distillation is preferably returned to the transesterification.

If an amphoteric catalyst is used, it is generally removed via hydrolysis and subsequent removal of the resultant metal oxide, e.g. via filtration. It is preferable that, after reaction has been completed, the catalyst is hydrolyzed by means of washing with water, and the precipitated metal oxide is removed by filtration. The filtrate can, if desired, be subjected to further work-up for the isolation and/or purification of the product. It is preferable that the product is isolated by distillation.

The transesterification of the di($C_1$-$C_2$)-alkyl esters of the dicarboxylic acids HO—C(=O)—X—C(=O)—OH with at least one alcohol $R^1$—OH and/or $R^2$—OH, or mixtures thereof, preferably takes place in the presence of at least one titanium(IV) alkoxide. Preferred titanium(IV) alkoxides are tetrapropoxytitanium, tetrabutoxytitanium, or mixtures thereof. It is preferable that the amount used of the alcohol component is at least twice the stoichiometric amount, based on the di($C_1$-$C_2$-alkyl) esters used.

The transesterification can be carried out in the absence of, or in the presence of, an added organic solvent. It is preferable that the transesterification is carried out in the presence of an inert organic solvent. Suitable organic solvents are those mentioned above for the esterification. Among these are specifically toluene and THF.

The transesterification is preferably carried out in the temperature range from 50 to 200° C.

The transesterification can take place in the absence of or in the presence of an inert gas. The expression inert gas generally means a gas which under the prevailing reaction conditions does not enter into any reactions with the starting materials, reagents, or solvents participating in the reaction, or with the resultant products. It is preferable that the transesterification takes place without addition of any inert gas.

The aliphatic dicarboxylic acids and cycloaliphatic alcohols used in preparing the compounds of the general formula (I) may either be acquired commercially or prepared by synthesis routes that are known from the literature.

Michael Tuttle Musser in "Cyclohexanol and Cyclohexanone" in "Ullmann's Encyclopedia of Industrial Chemistry" (2011) (DOI: 10.1002/14356007.a08_217.pub2) discloses technical synthetic pathways for the industrial recovery of cyclohexanol. Cyclohexanol can be recovered in principle via the pathway of the hydrogenation of phenol in the gas phase, or by catalyzed oxidation of cyclohexane using transition metal catalysts in the liquid phase by means of atmospheric oxygen. Cyclohexanol can be obtained more selectively and in higher yields by using boric acid in the liquid phase and carrying out oxidation with, again, atmospheric oxygen. This latter process proceeds via the intermediate of a peroxoboric ester of the cyclohexanol. Likewise performed on the industrial scale is a process starting from benzene. In that process, benzene is hydrogenated gradually, and cyclohexene is removed from the secondary components, such as unreacted benzene and cyclohexane. Then, in a catalyzed step, cyclohexene is reacted very selectively and in high yields (up to 95% over all the steps) to give cyclohexanol.

Michael Tuttle Musser, in "Adipinic Acid" in "Ullmann's Encyclopedia of Industrial Chemistry" (2000) (DOI: 10.1002/14356007.a01_269), discloses technical synthetic pathways for the industrial recovery of adipic acid. Nowadays virtually the entire worldwide demand for adipic acid is covered via the pathway of the oxidation of either cyclohexanol or cyclohexanone, or a mixture thereof, by means of nitric acid.

Compounds of the Genera Formula (II)

The compounds of the general formulae (II), (II.a) and (II.b) may be either acquired commercially or prepared by methods known in the prior art.

For example, the diesters may be obtained by esterification or transesterification of the dicarboxylic acids or suitable derivatives thereof with the corresponding alcohols. Customary methods are known to the skilled person. The esterification may take place by customary methods known to the skilled person.

Compounds of the General Formula (II.a)

In general the 1,2-cyclohexanedicarboxylic esters are obtained usually by ring hydrogenation of the corresponding phthalic esters. The ring hydrogenation may take place by the method described in WO 99/32427. One particularly suitable ring hydrogenation method is also described, for example, by WO 2011/082991 A2.

It is also possible for 1,2-cyclohexanedicarboxylic esters to be prepared in a reaction sequence composed of Diels-Alder reaction and subsequent hydrogenation and esterification or subsequent esterification and hydrogenation. Suitable methods are known to the skilled person, from WO 02/066412, for example.

Furthermore, 1,2-cyclohexanedicarboxylic esters can be obtained by esterification of 1,2-cyclohexanedicarboxylic acid or suitable derivatives thereof with the corresponding alcohols. The esterification may take place by customary methods known to the skilled person.

A common feature of the methods for preparing the compounds of the general formula (II.a) is that starting from phthalic acid, 1,2-cyclohexanedicarboxylic acid or suitable derivatives thereof, an esterification or a transesterification is carried out, with the corresponding $C_4$-$C_{12}$ alkanols being used as reactants. These alcohols are generally not pure substances, but are instead isomer mixtures whose composition and degree of purity are dependent on the particular method by which they are prepared.

Preferred $C_4$-$C_{12}$ alkanols which are used in preparing the compounds (II.a) present in the plasticizer composition of the invention may be straight-chain or branched or may consist of mixtures of straight-chain and branched $C_4$-$C_{12}$ alkanols. They include n-heptanol, isoheptanol, n-octanol, isooctanol, 2-ethylhexanol, n-nonanol, isononanol, isodecanol, 2-propylheptanol, n-undecanol, isoundecanol, n-dodecanol or isododecanol. Particular preference is given to $C_7$-$C_{12}$ alkanols, in particular, 2-ethylhexanol, isononanol, and 2-propylheptanol, especially isononanol.

Compounds of the Formula (II.b)

In general the terephthalic dialkyl esters are obtained by esterification of terephthalic acid or suitable derivatives thereof with the corresponding alcohols. The esterification may take place by customary methods known to the skilled person, as described in WO 2009/095126, for example.

A common feature of the methods for preparing the compounds of the formula (II.b) is that starting from terephthalic acid or suitable derivatives thereof, an esterification or a transesterification is carried out, with the corresponding $C_4$-$C_{12}$ alkanols being used as reactants. These alcohols are generally not pure substances, but are instead isomer mixtures whose composition and degree of purity are dependent on the particular method by which they are prepared. Preferred reactants used are $C_7$-$C_{12}$ alkanols.

Preferred $C_4$-$C_{12}$ alkanols which are used in preparing the compounds (II.b) present in the plasticizer composition of the invention may be straight-chain or branched or may consist of mixtures of straight-chain and branched $C_4$-$C_{12}$ alkanols. They include n-butanol, isobutanol, n-pentanol, isopentanol, n-hexanol, isohexanol, n-heptanol, isoheptanol, n-octanol, isooctanol, 2-ethylhexanol, n-nonanol, isononanol, isodecanol, 2-propylheptanol, n-undecanol, isoundecanol, n-dodecanol or isododecanol. Particular preference is given to $C_1$-$C_{12}$ alkanols, in particular 2-ethylhexanol, isononanol, and 2-propylheptanol, especially 2-ethylhexanol.

Compounds of the formula (II.b) are available commercially. An example of a suitable commercially available plasticizer of the formula (II.b) is di(2-ethylhexyl) terephthalate (DOTP), which is available under the trade name Eastman 168™ from Eastman Chemical B. V., Capelle aan den Ijssel, the Netherlands, and also under the trade name Palatinol® DOTP from BASF Corp., Florham Park, N.J., USA.

Alkanols

For the purposes of the present specification, with regard to the alkanols identified below, the term "isoalcohol" refers to a mixture of structural isomers, unless otherwise indicated.

Heptanol

The heptanols used in preparing the compounds of the general formula (II) may be straight-chain or branched or may consist of mixtures of straight-chain and branched heptanols. Preference is given to using mixtures of branched heptanols, also called isoheptanol, which are prepared by the rhodium-catalyzed, or preferably cobalt-catalyzed hydroformylation of dimer propene, obtainable for example by the Dimersol® process, and subsequent hydrogenation of the resulting isoheptanals to give an isoheptanol mixture. In accordance with its preparation, the isoheptanol mixture thus obtained consists of a plurality of isomers. Substantially straight-chain heptanols may be obtained by the rhodium-catalyzed or preferably cobalt-catalyzed hydroformylation of 1-hexene and subsequent hydrogenation of the resultant n-heptanal to n-heptanol. The hydroformylation of 1-hexene or dimer propene may take place according to processes known per se: In the case of the hydroformylation with rhodium catalysts dissolved homogeneously in the reaction medium, it is possible to use as catalyst not only noncomplexed rhodium carbonyls, which are formed in situ under the conditions of the hydroformylation reaction in the hydroformylation reaction mixture under the action of synthesis gas, from rhodium salts, for example, but also complex rhodium carbonyl compounds, more particularly complexes with organic phosphines, such as triphenylphosphine, or organophosphites, preferably chelating biphosphites, as described in U.S. Pat. No. 5,288,918, for example. In the case of the cobalt-catalyzed hydroformylation of these olefins, cobalt carbonyl compounds are generally used which are homogeneously soluble in the reaction mixture and which form from cobalt salts under the conditions of the hydroformylation reaction under the action of synthesis gas. Where the cobalt-catalyzed hydroformylation is performed in the presence of trialkyl- or triarylphosphines, the desired heptanols are formed directly as the hydroformylation product, meaning that there is no further need for hydrogenation of the aldehyde function.

Examples of suitable processes for the cobalt-catalyzed hydroformylation of the 1-hexene or of the hexene isomer mixtures are those industrially established processes elucidated in Falbe, New Syntheses with Carbon Monoxide, Springer, Berlin, 1980, on pages 162-168, such as the Ruhrchemie process, the BASF process, the Kuhlmann process, or the Shell process. While the Ruhrchemie, BASF, and Kuhlmann processes operate with non-ligand-modified cobalt carbonyl compounds as catalysts, and produce hexanal mixtures, the Shell process (DE-A 1593368) uses phosphine or phosphite ligand-modified cobalt carbonyl compounds as catalyst, which by virtue of their additional high hydrogenation activity lead directly to the hexanol mixtures.

Advantageous embodiments for the implementation of the hydroformylation with non-ligand-modified cobalt carbonyl complexes are described in detail in DE-A 2139630, DE-A 2244373, DE-A 2404855, and WO 01014297.

The rhodium-catalyzed hydroformylation of 1-hexene or of the hexene isomer mixtures can use the established industrial low-pressure rhodium hydroformylation process with triphenylphosphine-ligand-modified rhodium carbonyl compounds, which is subject matter of U.S. Pat. No. 4,148,830. Non-ligand-modified rhodium carbonyl compounds can serve advantageously as catalyst for the rhodium-catalyzed hydroformylation of long-chain olefins, for example of the hexene isomer mixtures obtained by the processes described above; this differs from the low-pressure process in requiring a higher pressure of from 80 to 400 bar. The conduct of high-pressure rhodium hydroformylation processes of this type is described by way of example in EP-A 695734, EP-B 880494, and EP-B 1047655.

The isoheptanal mixtures obtained after hydroformylation of the hexene isomer mixtures are catalytically hydrogenated in a manner that is per se conventional to give isoheptanol mixtures. For this purpose it is preferable to use heterogeneous catalysts which comprise, as catalytically active component, metals and/or metal oxides of groups VI to VIII, or else of transition group I, of the Periodic Table of the Elements, in particular chromium, molybdenum, manganese, rhenium, iron, cobalt, nickel, and/or copper, optionally deposited on a support material such as $Al_2O_3$, $SiO_2$ and/or $TiO_2$. Catalysts of this type are described by way of example in DE-A 3228881, DE-A 2628987, and DE-A 2445303. It is particularly advantageous to carry out the hydrogenation of the isoheptanals with an excess of hydrogen of from 1.5 to 20% above the stoichiometric amount of hydrogen needed for the hydrogenation of the isoheptanals, at temperatures of from 50 to 200° C., and at a hydrogen pressure of from 25 to 350 bar, and for avoidance of side-reactions to add, during the course of the hydrogenation, in accordance with DE-A 2628987, a small amount of water, advantageously in the form of an aqueous solution of an alkali metal hydroxide or alkali metal carbonate, in accordance with the teaching of WO 01087809.

Octanol

For many years, 2-ethylhexanol was the largest-production-quantity plasticizer alcohol, and it can be obtained through the aldol condensation of n-butyraldehyde to give 2-ethylhexenal and subsequent hydrogenation thereof to give 2-ethylhexanol (see Ullmann's Encyclopedia of Industrial Chemistry; 5th edition, vol. A 10, pp. 137-140, VCH Verlagsgesellschaft GmbH, Weinheim 1987).

Substantially straight-chain octanols can be obtained via rhodium- or preferably cobalt-catalyzed hydroformylation of 1-heptene and subsequent hydrogenation of the resultant n-octanal to give n-octanol. The 1-heptene needed for this purpose can be obtained from the Fischer-Tropsch synthesis of hydrocarbons.

By virtue of the production route used for the alcohol isooctanol, it is not a unitary chemical compound, in contrast to 2-ethylhexanol or n-octanol, but instead is an isomer mixture of variously branched $C_8$ alcohols, for example of 2,3-dimethyl-1-hexanol, 3,5-dimethyl-1-hexanol, 4,5-dimethyl-1-hexanol, 3-methyl-1-heptanol, and 5-methyl-1-heptanol; these can be present in the isooctanol in various quantitative proportions which depend on the production conditions and production processes used. Isooctanol is usually produced via codimerization of propene with butenes, preferably n-butenes, and subsequent hydroformylation of the resultant mixture of heptene isomers. The octanal isomer mixture obtained in the hydroformylation can subsequently be hydrogenated to give the isooctanol in a manner that is conventional per se.

The codimerization of propene with butenes to give isomeric heptenes can advantageously be achieved with the aid of the homogeneously catalyzed Dimersol® process (Chauvin et al; Chem. Ind.; May 1974, pp. 375-378), which uses, as catalyst, a soluble nickel phosphine complex in the presence of an ethylaluminum chlorine compound, for example ethylaluminum dichloride. Examples of phosphine ligands that can be used for the nickel complex catalyst are tributylphosphine, triisopropyl-phosphine, tricyclohexylphosphine, and/or tribenzylphosphine. The reaction takes place at temperatures of from 0 to 80° C., and it is advantageous here to set a pressure at which the olefins are present in solution in the liquid reaction mixture (Cornils; Hermann: Applied Homogeneous Catalysis with Organometallic Compounds; $2^{nd}$ edition, vol. 1; pp. 254-259, Wiley-VCH, Weinheim 2002).

In an alternative to the Dimersol® process operated with nickel catalysts homogeneously dissolved in the reaction medium, the codimerization of propene with butenes can also be carried out with heterogeneous NiO catalysts deposited on a support; heptene isomer distributions obtained here are similar to those obtained in the homogeneously catalyzed process. Catalysts of this type are by way of example used in what is known as the Octol® process (Hydrocarbon Processing, February 1986, pp. 31-33), and a specific heterogeneous nickel catalyst with good suitability for olefin dimerization or olefin codimerization is disclosed by way of example in WO 9514647.

Codimerization of propene with butenes can also use, instead of nickel-based catalysts, heterogeneous Brønsted-acid catalysts; heptenes obtained here are generally more highly branched than in the nickel-catalyzed processes. Examples of catalysts suitable for this purpose are solid phosphoric acid catalysts, e.g. phosphoric-acid-impregnated kieselguhr or diatomaceous earth, these being as utilized in the PolyGas® process for olefin dimerization or olefin oligomerization (Chitnis et al; Hydrocarbon Engineering 10, No. 6—June 2005). Brønsted-acid catalysts that have very good suitability for the codimerization of propene and butenes to give heptenes are zeolites, which are used in the EMOGAS® process, a further development based on the PolyGas® process.

The 1-heptene and the heptene isomer mixtures are converted to n-octanal and, respectively, octanal isomer mixtures by the known processes explained above in connection with the production of n-heptanal and heptanal isomer mixtures, by means of rhodium- or cobalt-catalyzed hydroformylation, preferably cobalt-catalyzed hydroformylation. These are then hydrogenated to give the corresponding octanols, for example by means of one of the catalysts mentioned above in connection with production of n-heptanol and of isoheptanol.

Nonanol

Substantially straight-chain nonanol can be obtained via rhodium- or preferably cobalt-catalyzed hydroformylation of 1-octene and subsequent hydrogenation of the resultant n-nonanal. The starting olefin 1-octene can be obtained by way of example by way of ethylene oligomerization by means of a nickel complex catalyst that is homogeneously soluble in the reaction medium—1,4-butanediol—with, for example, diphenyl-phosphinoacetic acid or 2-diphenylphosphinobenzoic acid as ligand. This process is also known as the Shell Higher Olefins Process or SHOP process (see Weisermel, Arpe: Industrielle Organische Chemie [Industrial organic chemistry]; $5^{th}$ edition, p. 96; Wiley-VCH, Weinheim 1998).

Isononanol which is used for the synthesis of the diisononyl esters of the general formula (II) comprised in the plasticizer composition of the invention, is not a unitary chemical compound, but instead is a mixture of variously branched, isomeric $C_9$-alcohols which can have various degrees of branching depending on the manner in which they were produced, and also in particular on the starting materials used. The isononanols are generally produced via dimerization of butenes to give isooctene mixtures, subsequent hydroformylation of the isooctene mixtures, and hydrogenation of the resultant isononanal mixtures to give isononanol mixtures, as explained in Ullmann's Encyclopedia of Industrial Chemistry, $5^{th}$ edition, vol. A1, pp. 291-292, VCH Verlagsgesellschaft GmbH, Weinheim 1995.

Both isobutene, cis- and trans-2-butene, and also 1-butene, or a mixture of these butene isomers, can be used as starting material for the production of the isononanols. The dimerization of pure isobutene, mainly catalyzed by means of liquid, e.g., sulfuric acid or phosphoric acid, or by means of solid, e.g., phosphoric acid applied to kieselguhr, $SiO_2$, or $Al_2O_3$, as support material, or zeolites, or Brønsted acids, mainly gives the highly branched compound 2,4,4-trimethylpentene, also termed diisobutylene, which gives highly branched isononanols after hydroformylation and hydrogenation of the aldehyde.

Preference is given to isononanols with a low degree of branching. Isononanol mixtures of this type with little branching are prepared from the linear butenes 1-butene, cis- and/or trans-2-butene, which optionally can also comprise relatively small amounts of isobutene, by way of the route described above involving butene dimerization, hydroformylation of the isooctene, and hydrogenation of the resultant isononanal mixtures. A preferred raw material is what is known as raffinate II, which is obtained from the $C_4$ cut of a cracker, for example of a steam cracker, after elimination of allenes, acetylenes, and dienes, in particular 1,3-butadiene, via partial hydrogenation thereof to give linear butenes, or removal thereof via extractive distillation, for example by means of N-methylpyrrolidone, and subsequent Brønsted-acid catalyzed removal of the isobutene comprised therein via reaction thereof with methanol or isobutanol by established large-scale-industrial processes with formation of the fuel additive methyl tert-butyl ether (MTBE), or of the isobutyl tert-butyl ether that is used to obtain pure isobutene.

Raffinate II also comprises, alongside 1-butene and cis- and trans-2-butene, n- and isobutane, and residual amounts of up to 5% by weight of isobutene.

The dimerization of the linear butenes or of the butene mixture comprised in raffinate II can be carried out by means of the familiar processes used on a large industrial scale, for example those explained above in connection with the production of isoheptene mixtures, for example by means of heterogeneous, Brønsted-acid catalysts such as those used in the PolyGas® process or EMOGAS® process, by means of the Dimersol® process with use of nickel complex catalysts homogeneously dissolved in the reaction medium, or by means of heterogeneous, nickel(II)-oxide-containing catalysts by the Octol® process or by the process of WO 9514647. The resultant isooctene mixtures are converted to isononanal mixtures by the known processes explained above in connection with the production of heptanal isomer mixtures, by means of rhodium or cobalt-catalyzed hydroformylation, preferably cobalt-catalyzed hydroformylation. These are then hydrogenated to give the suitable isononanol mixtures, for example by means of one of the catalysts mentioned above in connection with the production of isoheptanol.

The resultant isononanol isomer mixtures can be characterized by way of their iso-index, which can be calculated from the degree of branching of the individual, isomeric isononanol components in the isononanol mixture multiplied by the percentage proportion of these in the isononanol mixture: by way of example, n-nonanol contributes the value 0 to the iso-index of an isononanol mixture, methyloctanols (single branching) contribute the value 1, and dimethylheptanols (double branching) contribute the value 2. The higher the linearity, the lower the iso-index of the relevant isononanol mixture. Accordingly, the iso-index of an isononanol mixture can be determined via gas-chromatographic separation of the isononanol mixture into its individual isomers and attendant quantification of the percentage quantitative proportion of these in the isononanol mixture, determined by standard methods of gas-chromatographic analysis. In order to increase the volatility of the isomeric nonanols and improve the gas-chromatographic separation of these, they are advantageously trimethylsilylated by means of standard methods, for example via reaction with N-methyl-N-trimethylsilyltrifluoroacetamide, prior to gas-chromatographic analysis. In order to achieve maximum quality of separation of the individual components during gas-chromatographic analysis, it is preferable to use capillary columns with polydimethylsiloxane as stationary phase. Capillary columns of this type are obtainable commercially, and a little routine experimentation by the person skilled in the art is all that is needed in order to select, from the many different products available commercially, one that has ideal suitability for this separation task.

The diisononyl esters of the general formula (II) used in the plasticizer composition of the invention have generally been esterified with isononanols with an iso index of from 0.8 to 2, preferably from 1.0 to 1.8, and particularly preferably from 1.1 to 1.5, which can be produced by the abovementioned processes.

Possible compositions of isononanol mixtures that can be used for the production of the compounds of the general formula (II) used in accordance with the invention are stated below merely by way of example, and it should be noted here that the proportions of the isomers individually listed within the isononanol mixture can vary, depending on the composition of starting material, for example raffinate II, the composition of butenes in which can vary with the production process, and on variations in the production conditions used, for example the age of the catalysts utilized, and conditions of temperature and of pressure, which have to be adjusted appropriately thereto.

By way of example, an isononanol mixture produced via cobalt-catalyzed hydroformylation and subsequent hydrogenation from an isooctene mixture produced with use of raffinate II as raw material by means of the catalyst and process in accordance with WO 9514647 can have the following composition:

from 1.73 to 3.73% by weight, preferably from 1.93 to 3.53% by weight, particularly preferably from 2.23 to 3.23% by weight of 3-ethyl-6-methylhexanol;

from 0.38 to 1.38% by weight, preferably from 0.48 to 1.28% by weight, particularly preferably from 0.58 to 1.18% by weight of 2,6-dimethylheptanol;

from 2.78 to 4.78% by weight, preferably from 2.98 to 4.58% by weight, particularly preferably from 3.28 to 4.28% by weight of 3,5-dimethylheptanol;

from 6.30 to 16.30% by weight, preferably from 7.30 to 15.30% by weight, particularly preferably from 8.30 to 14.30% by weight of 3,6-dimethyiheptanol;

from 5.74 to 11.74% by weight, preferably from 6.24 to 11.24% by weight, particularly preferably from 6.74 to 10.74% by weight of 4,6-dimethyiheptanol;

from 1.64 to 3.64% by weight, preferably from 1.84 to 3.44% by weight, particularly preferably from 2.14 to 3.14% by weight of 3,4,5-trimethylhexanol;

from 1.47 to 5.47% by weight, preferably from 1.97 to 4.97% by weight, particularly preferably from 2.47 to 4.47% by weight of 3,4,5-trimethylhexanol, 3-methyl-4-ethylhexanol and 3-ethyl-4-methylhexanol;

from 4.00 to 10.00% by weight, preferably from 4.50 to 9.50% by weight, particularly preferably from 5.00 to 9.00% by weight of 3,4-dimethylheptanol;

from 0.99 to 2.99% by weight, preferably from 1.19 to 2.79% by weight, particularly preferably from 1.49 to 2.49% by weight of 4-ethyl-5-methylhexanol and 3-ethylheptanol;

from 2.45 to 8.45% by weight, preferably from 2.95 to 7.95% by weight, particularly preferably from 3.45 to 7.45% by weight of 4,5-dimethylheptanol and 3-methyloctanol;

from 1.21 to 5.21% by weight, preferably from 1.71 to 4.71% by weight, particularly preferably from 2.21 to 4.21% by weight of 4,5-dimethylheptanol;

from 1.55 to 5.55% by weight, preferably from 2.05 to 5.05% by weight, particularly preferably from 2.55 to 4.55% by weight of 5,6-dimethylheptanol;

from 1.63 to 3.63% by weight, preferably from 1.83 to 3.43% by weight, particularly preferably from 2.13 to 3.13% by weight of 4-methyloctanol;

from 0.98 to 2.98% by weight, preferably from 1.18 to 2.78% by weight, particularly preferably from 1.48 to 2.48% by weight of 5-methyloctanol;

from 0.70 to 2.70% by weight, preferably from 0.90 to 2.50% by weight, particularly preferably from 1.20 to 2.20% by weight of 3,6,6-trimethylhexanol;

from 1.96 to 3.96% by weight, preferably from 2.16 to 3.76% by weight, particularly preferably from 2.46 to 3.46% by weight of 7-methyloctanol;

from 1.24 to 3.24% by weight, preferably from 1.44 to 3.04% by weight, particularly preferably from 1.74 to 2.74% by weight of 6-methyloctanol;

from 0.1 to 3% by weight, preferably from 0.2 to 2% by weight, particularly preferably from 0.3 to 1% by weight of n-nonanol;

from 25 to 35% by weight, preferably from 28 to 33% by weight, particularly preferably from 29 to 32% by weight of other alcohols having 9 and 10 carbon atoms;

with the proviso that the entirety of the components mentioned gives 100% by weight.

In accordance with what has been said above, an isononanol mixture produced via cobalt-catalyzed hydroformylation and subsequent hydrogenation with use of an isooctene mixture produced by means of the PolyGas® process or EMOGAS® process with an ethylene-containing butene mixture as raw material can vary within the range of the compositions below, depending on the composition of the raw material and variations in the reaction conditions used:

from 6.0 to 16.0% by weight, preferably from 7.0 to 15.0% by weight, particularly preferably from 8.0 to 14.0% by weight of n-nonanol;

from 12.8 to 28.8% by weight, preferably from 14.8 to 26.8% by weight, particularly preferably from 15.8 to 25.8% by weight of 6-methyloctanol;

from 12.5 to 28.8% by weight, preferably from 14.5 to 26.5% by weight, particularly preferably from 15.5 to 25.5% by weight of 4-methyloctanol;

from 3.3 to 7.3% by weight, preferably from 3.8 to 6.8% by weight, particularly preferably from 4.3 to 6.3% by weight of 2-methyloctanol;

from 5.7 to 11.7% by weight, preferably from 6.3 to 11.3% by weight, particularly preferably from 6.7 to 10.7% by weight of 3-ethylheptanol;

from 1.9 to 3.9% by weight, preferably from 2.1 to 3.7% by weight, particularly preferably from 2.4 to 3.4% by weight of 2-ethylheptanol;

from 1.7 to 3.7% by weight, preferably from 1.9 to 3.5% by weight, particularly preferably from 2.2 to 3.2% by weight of 2-propylhexanol;

from 3.2 to 9.2% by weight, preferably from 3.7 to 8.7% by weight, particularly preferably from 4.2 to 8.2% by weight of 3,5-dimethylheptanol;

from 6.0 to 16.0% by weight, preferably from 7.0 to 15.0% by weight, particularly preferably from 8.0 to 14.0% by weight of 2,5-dimethylheptanol;

from 1.8 to 3.8% by weight, preferably from 2.0 to 3.6% by weight, particularly preferably from 2.3 to 3.3% by weight of 2,3-dimethylheptanol;

from 0.6 to 2.6% by weight, preferably from 0.8 to 2.4% by weight, particularly preferably from 1.1 to 2.1% by weight of 3-ethyl-4-methylhexanol;

from 2.0 to 4.0% by weight, preferably from 2.2 to 3.8% by weight, particularly preferably from 2.5 to 3.5% by weight of 2-ethyl-4-methylhexanol;

from 0.5 to 6.5% by weight, preferably from 1.5 to 6% by weight, particularly preferably from 1.5 to 5.5% by weight of other alcohols having 9 carbon atoms; with the proviso that the entirety of the components mentioned gives 100% by weight.

Decanol

Isodecanol, which is used for the synthesis of the diisodecyl esters of the general formula (II) comprised in the plasticizer composition of the invention, is not a unitary chemical compound, but instead is a complex mixture of differently branched isomeric decanols.

These are generally produced via nickel- or Brønsted-acid-catalyzed trimerization of propylene, for example by the PolyGas® process or the EMOGAS® process explained above, subsequent hydroformylation of the resultant isononene isomer mixture by means of homogeneous rhodium or cobalt carbonyl catalysts, preferably by means of cobalt carbonyl catalysts, and hydrogenation of the resultant isodecanol isomer mixture, e.g. by means of the catalysts and processes mentioned above in connection with the production of $C_7$-$C_9$-alcohols (Ullmann's Encyclopedia of Industrial Chemistry; $5^{th}$ edition, vol. A1, p. 293, VCH Verlagsgesellschaft GmbH, Weinheim 1985). The resultant isodecanol generally has a high degree of branching.

2-Propylheptanol, which is used for the synthesis of the di(2-propylheptyl) esters of the general formula (II) comprised in the plasticizer composition of the invention, can be pure 2-propylheptanol or can be propylheptanol isomer mixtures of the type generally formed during the industrial production of 2-propylheptanol and likewise generally termed 2-propylheptanol.

Pure 2-propylheptanol can be obtained via aldol condensation of n-valeraldehyde and subsequent hydrogenation of the resultant 2-propylheptanal, for example in accordance with U.S. Pat. No. 2,921,089. By virtue of the production process, commercially obtainable 2-propylheptanol generally comprises, alongside the main component 2-propylheptanol, one or more of the following isomers of 2-propylheptanol: 2-propyl-4-methylhexanol, 2-propyl-5-methylhexanol, 2-isopropylheptanol, 2-isopropyl-4-methylhexanol, 2-isopropyl-5-methylhexanol, and/or 2-propyl-4,4-dimethylpentanol. The presence of other isomers of 2-propylheptanol, for example 2-ethyl-2,4-dimethylhexanol, 2-ethyl-2-methylheptanol, and/or 2-ethyl-2,5-dimethylhexanol, in the 2-propylheptanol is possible, but because the rates of formation of the aldehydic precursors of these isomers in the aldol condensation are low, the amounts of these present in the 2-propylheptanol are only trace amounts, if they are present at all, and they play practically no part in determining the plasticizer properties of the compounds produced from these 2-propylheptanol isomer mixtures.

Various hydrocarbon sources can be utilized as starting material for the production of 2-propylheptanol, for example 1-butene, 2-butene, raffinate I—an alkane/alkene mixture which is obtained from the $C_4$ cut of a cracker after removal of allenes, of acetylenes, and of dienes and which also comprises, alongside 1- and 2-butene, considerable amounts of isobutene—or raffinate II, which is obtained from raffinate I via removal of isobutene and then comprises, as olefin components other than 1- and 2-butene, only small proportions of isobutene. It is also possible, of course, to use mixtures of raffinate I and raffinate II as raw material for the production of 2-propylheptanol. These olefins or olefin mixtures can be hydroformylated by methods that are conventional per se with cobalt or rhodium catalysts, and 1-butene here gives a mixture of n- and isovaleraldehyde—the term isovaleraldehyde designating the compound 2-methylbutanal, the n/iso ratio of which can vary within relatively wide limits, depending on catalyst used and on hydroformylation conditions. By way of example, when a triphenylphosphine-modified homogeneous rhodium catalyst (Rh/TPP) is used, n- and isovaleraldehyde are formed in an n/iso ratio that is generally from 10:1 to 20:1 from 1-butene, whereas when rhodium hydroformylation catalysts modified with phosphite ligands are used, for example in accordance with U.S. Pat. No. 5,288,918 or WO 05028407, or when rhodium hydroformylation catalysts modified with phosphoramidite ligands are used, for example in accordance with WO 0283695, n-valeraldehyde is formed almost exclusively. While the Rh/TPP catalyst system converts 2-butene only very slowly in the hydroformylation, and most of the 2-butene can therefore be reclaimed from the hydroformylation mixture, 2-butene is successfully hydroformylated with the phosphite-ligand- or phosphorus amidite ligand-modified rhodium catalysts mentioned, the main product formed being n-valeraldehyde. In contrast, isobutene comprised within the olefinic raw material is hydroformylated at varying rates by practically all catalyst systems to 3-methylbutanal and, in the case of some catalysts, to a lesser extent to pivalaldehyde.

The $C_5$ aldehydes obtained in accordance with starting materials and catalysts used, i.e., n-valeraldehyde optionally mixed with isovaleraldehyde, 3-methylbutanal, and/or pivalaldehyde, can be separated, if desired, completely or to some extent by distillation into the individual components prior to the aldol condensation, and here again there is therefore a possibility of influencing and of controlling the composition of isomers of the $C_{10}$ alcohol component of the ester mixtures used in the process of the invention. Equally, it is possible that the $C_5$ aldehyde mixture formed during the hydroformylation is introduced into the aldol condensation without prior isolation of individual isomers. If n-valeraldehyde is used in the aldol condensation, which can be carried out by means of a basic catalyst, for example an aqueous solution of sodium hydroxide or of potassium hydroxide, for example by the processes described in EP-A 366089, U.S. Pat. No. 4,426,524, or U.S. Pat. No. 5,434,313, 2-propylheptenal is produced as sole condensate, whereas if a mixture of isomeric $C_5$ aldehydes is used the product comprises an isomer mixture of the products of the homoaldol condensation of identical aldehyde molecules and of the crossed aldol condensation of different valeraldehyde isomers. The aldol condensation can, of course, be controlled via targeted reaction of individual isomers in such a way that a single aldol condensation isomer is formed predominantly or entirely. The relevant aldol condensates can then be hydrogenated with conventional hydrogenation catalysts, for example those mentioned above for the hydrogenation of aldehydes, to give the corresponding alcohols or alcohol mixtures, usually after preceding, preferably distillative isolation from the reaction mixture and, if desired, distillative purification.

As mentioned above, the compounds of the general formula (II) comprised in the plasticizer composition of the invention can have been esterified with pure 2-propylheptanol. However, production of said esters generally uses mixtures of 2-propylheptanol with the propylheptanol isomers mentioned in which the content of 2-propylheptanol is at least 50% by weight, preferably from 60 to 98% by weight, and particularly preferably from 80 to 95% by weight, in particular from 85 to 95% by weight.

Suitable mixtures of 2-propylheptanol with the propylheptanol isomers comprise by way of example those of from 60 to 98% by weight of 2-propylheptanol, from 1 to 15% by weight of 2-propyl-4-methylhexanol, and from 0.01 to 20% by weight of 2-propyl-5-methylhexanol, and from 0.01 to 24% by weight of 2-isopropylheptanol, where the sum of the proportions of the individual constituents does not exceed 100% by weight. It is preferable that the proportions of the individual constituents give a total of 100% by weight.

Other suitable mixtures of 2-propylheptanol with the propylheptanol isomers comprise by way of example those of from 75 to 95% by weight of 2-propylheptanol, from 2 to 15% by weight of 2-propyl-4-methylhexanol, from 1 to 20% by weight of 2-propyl-5-methylhexanol, from 0.1 to 4% by weight of 2-isopropylheptanol, from 0.1 to 2% by weight of 2-isopropyl-4-methylhexanol, and from 0.1 to 2% by weight of 2-isopropyl-5-methylhexanol, where the sum of the proportions of the individual constituents does not exceed 100% by weight. It is preferable that the proportions of the individual constituents give a total of 100% by weight.

Preferred mixtures of 2-propylheptanol with the propylheptanol isomers comprise those with from 85 to 95% by weight of 2-propylheptanol, from 5 to 12% by weight of 2-propyl-4-methylhexanol, and from 0.1 to 2% by weight of 2-propyl-5-methylhexanol, and from 0.01 to 1% by weight of 2-isopropylheptanol, where the sum of the proportions of the individual constituents does not exceed 100% by weight. It is preferable that the proportions of the individual constituents give a total of 100% by weight.

When the 2-propylheptanol isomer mixtures mentioned are used instead of pure 2-propylheptanol for the production of the compounds of the general formula (II), the isomer composition of the alkyl ester groups and, respectively, alkyl ether groups corresponds in practical terms to the composition of the propylheptanol isomer mixtures used for the esterification.

Undecanol

The undecanols, which are used for the production of the compounds of the general formula (II) comprised in the plasticizer composition of the invention, can be straight-chain or branched, or can be composed of mixtures of straight-chain and branched undecanols. It is preferable to use, as alcohol component, mixtures of branched undecanols, also termed isoundecanol.

Substantially straight-chain undecanol can be obtained via rhodium- or preferably cobalt-catalyzed hydroformylation of 1-decene and subsequent hydrogenation of the resultant n-undecanal. The starting olefin 1-decene is produced by way of the SHOP process mentioned previously for the production of 1-octene.

For the production of branched isoundecanol, the 1-decene obtained in the SHOP process can be subjected to skeletal isomerization, for example by means of acidic zeolitic molecular sieves, as described in WO 9823566, in which case mixtures of isomeric decenes are formed, rhodium- or preferably cobalt-catalyzed hydroformylation of which, with subsequent hydrogenation of the resultant isoundecanal mixtures, gives the isoundecanol used in the production of the compounds (II) employed in accordance with the invention. Hydroformylation of 1-decene or of isodecene mixtures by means of rhodium or cobalt catalysis can be achieved as described previously in connection with the synthesis of $C_7$-$C_{10}$ alcohols. Similar considerations apply to the hydrogenation of n-undecanal or of isoundecanal mixtures to give n-undecanol and, respectively, isoundecanol.

After distillative purification of the hydrogenation product, the resultant $C_7$-$C_{11}$ alkyl alcohols or a mixture of these can be used as described above for the production of the diester compounds of the general formula (II) used in the invention.

Dodecanol

Substantially straight-chain dodecanol can be obtained advantageously by way of the Alfol® process or Epal® process. These processes include the oxidation and hydrolysis of straight-chain trialkylaluminum compounds which are constructed stepwise by way of a plurality of ethylation reactions, starting from triethylaluminum, with use of Ziegler-Natta catalysts. The desired n-dodecanol can be obtained from the resultant mixtures of substantially straight-chain alkyl alcohols of varying chain length after distillative discharge of the $C_{12}$ alkyl alcohol fraction.

Alternatively, n-dodecanol can also be produced via hydrogenation of natural fatty acid methyl esters, for example from coconut oil.

Branched isododecanol can be obtained by analogy with the known processes for the codimerization and/or oligomerization of olefins as described, for example, in WO 0063151, with subsequent hydroformylation and hydrogenation of the isoundecene mixtures as described, for example, in DE-A 4339713. After distillative purification of the hydrogenation product, the resultant isododecanols or mixtures of these can be used as described above for the production of the diester compounds of the general formula (II) used in the invention.

Plastisol Applications

As described above, the good gelling properties of the plasticizer composition of the invention makes it particularly suitable for the production of plastisols.

The invention therefore further provides the use of a plasticizer composition as defined above as plasticizer in a plastisol.

Plastisols can be produced from various plastics. In one preferred embodiment, the plastisols of the invention are PVC plastisols.

The content of plasticizer composition of the invention in the PVC plastisols is usually from 5 to 300 phr, preferably from 30 to 200 phr.

Plastisols are usually converted to the form of the finished product at ambient temperature via various processes, such as spreading process, screenprinting process, casting processes, for example the slush molding process or rotomolding process, dip-coating process, spray process, and the like.

Gelling then takes place via heating, whereupon cooling gives a homogeneous product with relatively high or relatively low flexibility.

PVC plastisols are particularly suitable for the production of PVC foils, for the production of seamless hollow bodies and of gloves, and for use in the textile sector, e.g. for textile coatings.

The PVC plastisols based on the plasticizer composition of the invention are specifically suitable for the production of synthetic leather, e.g. of synthetic leather for motor vehicle construction; underbody protection for motor vehicles; seam seals; carpet-backing coatings; high-weight coatings; conveyor belts; dip coatings, and items produced by means of dip processes; toys, such as dolls, balls, and toy animals; anatomical models for educational uses; floorcoverings; wallcoverings; (coated) textiles, for example latex apparel, protective apparel, and rainproof apparel, for example rainproof jackets; tarpaulins; roofing membranes; tents; strip coatings; sealing compositions for closures; respiratory masks, and gloves.

Molding Composition Applications

The molding composition of the invention is preferably used for the production of moldings and foils. Among these are in particular housings of electrical devices, for example of kitchen appliances, and computer housings; tooling; equipment; piping; cables; hoses, for example plastics hoses, water hoses and irrigation hoses, industrial rubber hoses, or chemicals hoses; wire sheathing; window profiles; vehicle-construction components, for example bodywork constituents, vibration dampers for engines; tires; furniture, for example chairs, tables, or shelving; cushion foam and mattress foam; tarpaulins, for example truck tarpaulins or flysheets; gaskets; composite foils, such as foils for laminated safety glass, in particular for vehicle windows and/or window panes; records; synthetic leather; packaging containers; adhesive-tape foils, or coatings.

The molding composition of the invention is also suitable for the production of moldings and foils which come directly into contact with people or with foods. These are primarily medical products, hygiene products, packaging for food or drink, products for the interior sector, toys and childcare items, sports-and-leisure products, apparel, or fibers for textiles, and the like.

The medical products which can be produced from the molding composition of the invention are by way of example tubes for enteral nutrition and hemodialysis, respiratory tubes, infusion tubes, infusion bags, blood bags, catheters, tracheal tubes, disposable syringes, gloves, or breathing masks.

The packaging that can be produced from the molding composition of the invention for food or drink is by way of example freshness-retention foils, food-or-drink hoses, drinking-water hoses, containers for storing or freezing food or drink, lid seals, closure caps, crown corks, or synthetic corks for wine.

The products which can be produced from the molding composition of the invention for the interior sector are by way of example ground-coverings, which can be of homogeneous structure or can be composed of a plurality of layers, for example of at least one foamed layer, examples being floorcoverings, sports floors, or luxury vinyl tiles (LVTs), synthetic leathers, wallcoverings, or foamed or unfoamed wallpapers, in buildings, or can be cladding or console covers in vehicles.

The toys and childcare items which can be produced from the molding composition of the invention are by way of example dolls, inflatable toys, such as balls, toy figures, modeling clays, swimming aids, stroller covers, baby-changing mats, bedwarmers, teething rings, or bottles.

The sports-and-leisure products that can be produced from the molding composition of the invention are by way of example gymnastics balls or other balls, exercise mats, seat cushions, massage balls and massage rollers, shoes and shoe soles, air mattresses, or drinking bottles.

The apparel that can be produced from the molding compositions of the invention is by way of example latex clothing, protective clothing, rain jackets or rubber boots.

Non-PVC Applications

The present invention also includes the use of the plasticizer composition of the invention, as defined above, as and/or in auxiliaries selected from: calendering auxiliaries; rheology auxiliaries; surfactant compositions, such as flow aids and film-forming aids, defoamers, antifoams, wetting agents, coalescing agents, and emulsifiers; lubricants, such as lubricating oils, lubricating greases, and lubricating pastes; quenchers for chemical reactions; phlegmatizing agents; pharmaceutical products; plasticizers in adhesives or sealants; impact modifiers, and standardizing additives.

The examples and the figures described below provide further explanation of the invention. These examples and figures are not to be understood as restricting the invention.

The examples and figures hereinafter use the following abbreviations: phr for parts by weight per 100 parts by weight of polymer.

EXAMPLES

Ingredients used in the examples are as follows:

| Ingredient | Manufacturer |
| --- | --- |
| Homopolymeric emulsion-PVC, brand name Solvin ® 367 NC | INOVYN ChlorVinyls Limited, London, UK |
| Homopolymeric emulsion-PVC, brand name Vinnolit ® P 70 | Vinnolit GmbH, Ismaning, Germany |
| Isononyl benzoate, brand name Vestinol ® INB | Evonik, Marl, Germany |
| Isodecyl benzoate, brand name Jayflex ® MB 10 | Exxonmobil Chemical Belgium, Antwerp, Belgium |
| Diisononyl cyclohexanedicarboxylate, brand name Hexamoll ® DINCH ® | BASF SE, Ludwigshafen, Germany |
| Diisononyl phthalate, brand name Palatinol ® N | BASF SE, Ludwigshafen, Germany |
| Dibutyl phthalate, brand name Palatinol ® C | BASF SE, Ludwigshafen, Germany |
| Di(2-ethylhexyl) terephthalate (DOTP), brand name Eastman 168 ™ | Eastman Chemical B.V., Capelle aan den Ijssel, the Netherlands |
| Ba—Zn stabilizer, brand name Reagens ® SLX/781 | Reagens S.p.A., Bologna, Italy |

A) Preparation of an inventively employed compound (I)

Example A1 Synthesis of Dicyclohexyl Adipate by Direct Esterification

A 2 L round-neck flask equipped with a Dean-Stark water separator and a dropping funnel with pressure compensation was charged with 600 g (6.00 mol, 4.0 equivalents) of cyclohexanol in 500 g of toluene. The mixture was heated with stirring to reflux and 219 g (1.50 mol, 1.0 equivalent) of adipic acid, followed by 11.5 g (0.12 mol, 8 mol %) of 99.9% strength sulfuric acid in 3 to 4 portions, were added whenever the reaction slowed down. The course of the reaction was monitored from the amount of water deposited in the Dean-Stark apparatus. Following complete conversion, a sample was taken from the reaction mixture and analyzed by gas chromatography (GC). The reaction mixture was cooled to room temperature, transferred to a separating funnel, and washed twice with saturated NaHCO$_3$ solution. The organic phase was washed with saturated sodium chloride solution and dried over anhydrous Na$_2$SO$_4$ and the solvent was removed under reduced pressure.

The resulting dicyclohexyl adipate is a white solid having a melting point of 34° C. which possesses an acid number of 0.03 mg KOH/g, a water content of 0.02%, and a purity by GC of 99.86%.

B) Determination of the Solvation Temperature to DIN 53408

For characterizing the gelling performance of the inventively employed compounds (I) in PVC, the solvation temperature was determined in accordance with DIN 53408. The lower the solvation temperature, the better the gelling performance of the substance in question for PVC.

The table below sets out the salvation temperatures of the inventively employed plasticizer dicyclohexyl adipate and as a comparator the solvation temperatures of the commercially available fast fusers Vestinol® INB and Jayflex® MB 10, and the commercially available plasticizers Hexamoll® DINCH®, Eastman 168™, and Palatinol® N.

| Example | Substance | Solvation temperature to DIN 53408 [° C.] |
|---|---|---|
| B1 * | Dicyclohexyl adipate | 93 |
| B2 | Vestinol ® INB | 128 |
| B3 | Jayflex ® MB 10 | 131 |
| B4 * | Hexamoll ® DINCH ® | 151 |
| B5 * | Eastman 168 ™ | 144 |
| B6 | Palatinol ® N | 131 |

* These compounds are used in the inventive plasticizer compositions.

As can be seen from the table, the inventively employed fast fuser dicyclohexyl adipate shows a much lower solvation temperature than commercially available fast fusers Vestinol® INB, Jayflex® MB 10, Hexamoll® DINCH®, Eastman 168™, and Palatinol® N.

C) Performance tests

C1) Determination of the gelling performance of PVC plastisols comprising the inventive plasticizer composition To investigate the gelling performance of PVC plastisols based on the inventive plasticizer compositions, PVC plastisols were produced, according to the formula below, comprising plasticizer compositions in different proportions:

| Ingredient | Proportion [phr] |
|---|---|
| PVC (mixture of 70 parts by weight homopolymeric emulsion-PVC, brand name Solvin ® 367 NC, and 30 parts by weight homopolymeric emulsion-PVC, brand name Vinnolit ® P 70) | 100 |
| Inventive plasticizer composition | 100 |
| Ba—Zn stabilizer, Reagens ® SLX/781 | 2 |

Produced for comparison, additionally, were plastisols comprising comparative plasticizers as individual components.

The plastisols were produced by weighing out the two PVC grades together in a PE (polyethylene) beaker. The liquid components were weighed out into a second PE beaker. A dissolver (Jahnke & Kunkel, IKA-Werk, model RE-166 A, 60-6000 1/min, dissolver disk diameter=40 mm) was used at 400 rpm to stir the PVC into the liquid components. When a plastisol had formed, the speed was increased to 2500 1/min and homogenization was carried out for 150 seconds. The plastisol was transferred from the PE beaker into a steel dish, which was subjected to a pressure of 10 mbar in a desiccator. The aim of this was to remove the air in the plastisol. The plastisol expanded to a greater or lesser extent in line with the air content. At this stage, the desiccator was shaken to disrupt the surface of the plastisol and cause it to collapse. From this point in time onward, the plastisol was left in the desiccator under a pressure of 10 mbar for a further 15 min. Then the vacuum pump was switched off, air was admitted to the desiccator, and the plastisol was transferred back into the PE beaker. The plastisol thus obtained was used for the rheological measurements. For all plastisols, measurement began 30 minutes after homogenization.

To gel a liquid PVC plastisol and to convert it from the state of PVC particles in homogeneous suspension in plasticizer into a homogeneous, solid flexible-PVC matrix, the energy needed must be supplied in the form of heat. In a processing operation, the parameters of temperature and residence time are available for this purpose. The quicker gelling proceeds (the indicator here is the solvation temperature—the lower this temperature, the quicker the material gels), the lower the temperature (for a given residence time) or the residence time (for a given temperature) that can be selected.

The gelling performance of a plastisol was investigated by an in-house method using an MCR302 rheometer from Anton Paar. The parameter measured here was the viscosity of the paste while heating with constant low shear (oscillation).

Parameters used for the oscillation tests were as follows:
measuring system: parallel plates, 50 mm diameter
amplitude: 1%
frequency: 1 Hz
gap width: 1 mm
initial temperature: 20° C.
temperature profile: 20° C. to 200° C.
heating rate: 10 K/min
number of measurement points: 201
duration of each measurement point: 0.09 min Measurement took place in two steps. The first step was used to condition the sample. At 20° C., the plastisol was subjected to gentle shearing for 2 minutes at constant amplitude (gamma) with γ=1%. In the second step, the temperature program was used. In the measurement, the storage modulus and the loss modulus were recorded. From these two variables, the complex viscosity η* was computed. The temperature at which the maximum of the complex viscosity was attained was identified as the gelling temperature of the plastisol.

C$_2$) Determination of the gelling performance of PVC plastisols based on the inventive plasticizer composition in comparison to PVC plastisols comprising Comparative Plasticizer Compositions or Comparative Plasticizers To compare the gelling performance of PVC plastisols comprising the plasticizer compositions of the invention with PVC plastisols comprising comparative plasticizer compositions or comparative plasticizers, the procedure was as described under C1).

C$_3$) Determination of the process volatility of the inventive plasticizer compositions in comparison to comparative plasticizer compositions and comparative plasticizers Process volatility refers to the weight loss of plasticizer during plastisol processing. As described under C2), plastisols were produced with an inventive plasticizer composition and with comparative plasticizer compositions.

The formula used was as follows:

| Ingredient | Proportion [phr] |
|---|---|
| PVC (mixture of 70 parts by weight homopolymeric emulsion-PVC, brand name Solvin ® 367 NC, and 30 parts by weight homopolymeric emulsion-PVC, brand name Vinnolit ® P 70) | 100 |
| Plasticizer composition | 60 |
| Ba—Zn stabilizer, Reagens ® SLX/781 | 2 |

Produced for comparison, additionally, were plastisols comprising exclusively comparative plasticizers as individual components, Production of a Foil Precursor In order to allow determination of the performance properties from the plastisols, the liquid plastisol must be converted into a processable solid foil. For this purpose the plastisol was pregelled at a low temperature. Gelling of the plastisols took place in a Mathis oven.

The settings used on the Mathis oven were as follows:
exhaust air: flap fully open
fresh air: open
air circulation: maximum position
upper air/lower air: upper air setting 1

A new relay paper was clamped into the clamping apparatus on the Mathis oven. The oven was preheated to 140° C. and the gelling time was set to 25 s. The gap was set by using the thickness template to adjust the gap between paper and doctor to 0.1 mm. The dial gauge thickness was set to 0.1 mm. The gap was then set to a value of 0.7 mm on the dial gauge.

The plastisol was applied to the paper and spread smoothly using the doctor. The clamping apparatus was then moved into the oven via the start button. After 25 s, the clamping apparatus was moved back out of the oven. The plastisol had gelled, and the resultant foil was subsequently peeled in one piece from the paper. The thickness of this foil was about 0.5 mm.

Determination of the Process Volatility

Process volatility was determined by using a metal Shore hardness punch to punch 3 square test specimens (49×49 mm) from the foil precursor, weighing these squares, and then gelling them in the Mathis oven at 190° C. for 2 minutes. After cooling, these specimens were weighed again and the weight loss in % was calculated. For this purpose, the specimens were always positioned exactly at the same location on the relay paper.

C4) Determination of the foil volatility of foils of plastisols comprising the inventive plasticizer compositions in comparison to foils produced from plastisols comprising comparative plasticizer compositions or comparative plasticizers The foil volatility is a measure of the volatility of a plasticizer in the finished plasticized PVC article. For the testing of foil volatility, as described under C3), plastisols comprising the inventive plasticizer composition and plastisols comprising comparative plasticizer compositions were produced. Additionally, plastisols were produced that contained exclusively the comparative plasticizers as an individual component.

For the tests here, however, a foil precursor was not first produced; instead, the plastisol was gelled directly in the Mathis oven at 190° C. for 2 min. The foil volatility was tested on the resultant foils, which had a thickness of about 0.5 mm.

Testing of the foil volatility over 24 h at 130° C.

For the determination of the foil volatility, four individual foils (150×100 mm) were cut from the plastisols gelled at 190° C. for 2 min, and were perforated and weighed. The foils were suspended from a rotating star in a Heraeus 5042 E drying cabinet set at 130° C. Within the cabinet, the air was changed 18 times an hour. This corresponds to 800 l/h fresh air. After 24 hours in the cabinet, the foils were removed and reweighed. The weight loss in percent indicates the foil volatility of the plasticizer compositions.

C5) Determination of the shore a hardness of foils produced from plastisols comprising the inventive plasticizer composition in comparison to foils produced from plastisols comprising comparative plasticizer compositions or comparative plasticizers The Shore A hardness is a measure of the elasticity of plasticized PVC articles. The lower the Shore hardness, the greater the elasticity of the PVC articles. For the determination of the Shore A hardness, as described under C3), foil sections measuring 49×49 mm were punched from the foil precursors and gelled for 2 min at 190° C. in analogy to the volatility test, in each case as groups of three. A total of 27 foil pieces were gelled in this way. These 27 pieces were placed on top of one another in a pressing frame and pressed at 195° C. to give a Shore block 10 mm thick.

Description of the Shore hardness measurement:
method: DIN EN ISO 868, Oct. 2003
title: Determination of impression hardness using a durometer (Shore hardness)
instrument: Hildebrand DD-3 digital durometer
test specimens:
dimensions: 49 mm×49 mm×10 mm (length×width×thickness)
production: pressed from about 27 gelled foils 0.5 mm thick
pressing temperature: 195° C.=5° C. more than the production of the gelled foils
storage time before measurement: 7 d in climate chamber at 23° C. and 50% relative humidity
measuring time: 15 s (time from needle on the specimen to reading off the value)
10 individual values are measured and the average is calculated from them.

The Shore A hardness measurement value was read off after 15 seconds in each case.

C6) Determination of the mechanical values of plastisol foils comprising inventively employed plasticizer compositions, in comparison to plastisol foils comprising comparative plasticizer compositions or comparative plasticizers The mechanical properties of plasticized PVC articles are characterized for example by means of the parameters of elongation at break, breaking stress, and 100% modulus. The higher this value of the elongation at break, the better the mechanical properties of the plasticized PVC article. Lower values for breaking stress and 100% modulus are indicative of a more efficient plasticizer.

For the testing of the mechanical values, plastisols were produced as described under C3) with an inventive plasticizer composition and with comparative plasticizer compositions. As a further comparison, moreover, plastisols were produced that contained exclusively comparative plasticizers as an individual component.

For the tests here, however, a foil precursor was not first produced; instead, the plastisol was gelled directly in the Mathis oven at 190° C. for 2 min. Testing of the mechanical properties took place on the resultant foils, whose thickness was about 0.5 mm.

The parameters of elongation at break, breaking stress, and 100% modulus are determined in accordance with DIN EN ISO 527, Parts 1 and 3.

In detail, the procedure is as follows:
machine: Zwick model TMZ 2.5/TH1S.
method: testing to DIN EN ISO 527 Part 1 and Part 3,
test specimens: foil strips of type 2 as per DIN EN ISO 527 Part 3, punched, 150 mm long, 15 mm wide,
number of specimens per test: 10 specimens are ruptured,
conditions: standard conditions of 23° C. (+−1° C.), 50% relative humidity,
storage time of the specimens prior to measurement: 7 days under standard conditions,
clamps: smooth-convex with 6 bar clamp pressure,
clamped-in length: 100 mm,
measurement length (=clamped length): 100 mm, test velocity: 100 mm/min.

C7) Determination of the compatibility of foils produced from plastisols comprising the inventive plasticizer composition in comparison to foils produced from plastisols comprising comparative plasticizer compositions or comparative plasticizers The compatibility of plasticizers in plasticized PVC articles characterizes the extent to which plasticizers tend to exude from the plasticized PVC articles during use and thereby adversely affect the service properties of the PVC article.

For the testing of the compatibility, plastisols with an inventive plasticizer composition and plastisols with comparative plasticizer compositions were produced as described under C3). As a further comparison, moreover, plastisols were produced which contained comparative plasticizers as an individual component.

For the tests here, however, a foil precursor was not first produced; instead, the plastisol was gelled directly in the Mathis oven at 190° C. for 2 min. The compatibility testing was carried out on the resultant foils, whose thickness was about 0.5 mm.

Test Method

Purpose of the test method: The test serves for qualitative and quantitative measurement of the compatibility of flexible-PVC formulas. Testing was carried out at elevated temperature (70° C.) and elevated humidity (100% relative humidity). The data obtained were evaluated against the storage time.

Test specimens: For the standard test, 10 test specimens (foils) of each formula with a size of 75×110×0.5 mm are used. The foils are perforated on the broad side, inscribed, and weighed. The inscription must be indelible and may be done using a soldering iron, for example.

Test equipment: Heating cabinet, analytical balance, temperature measuring instrument with sensor for measuring the internal chamber temperature of the heating cabinet, glass tank, metal rack made from rustproof material.

Test temperature: 70° C.

Test medium: Water vapor produced at 70° C. from fully demineralized water.

Procedure: The temperature in the interior chamber of the heating cabinet was set to the required 70° C. The test foils were suspended on a wire rack and inserted into a glass tank filled to a height of about 5 cm with water (fully demineralized water). Only foils having the same composition were stored in a labeled and numbered tank, in order to prevent interference and to facilitate removal after the respective storage times. The glass tank was given a vapor-tight seal using a polyethylene film, so that the water vapor produced later on in the glass tank does not escape.

Storage time and determination: After storage times respectively of 1, 3, 7, 14 and 28 days, 2 foils in each case (duplicate determination) were removed from the glass tank and acclimatized in the air for 1 hour, in free suspension. Thereafter the foil was cleaned in a fume hood using methanol (towel moistened with methanol) and weighed (wet value). The foil was subsequently dried, in free suspension, in a drying cabinet at 70° C. for 16 hours (natural convection). Following removal from the drying cabinet, the foil was conditioned for 1 hour in free suspension in the laboratory and was subsequently weighed again (dry value). The test result reported in each case is the arithmetic mean of the changes in weight from the determination of the dry value.

D) Performance tests of inventive plasticizer compositions comprising compounds of the formula (II.a)

D1) Determination of the gelling performance of PVC plastisols comprising the inventive plasticizer composition comprising compounds of the formula (II.a)

In accordance with the formula described under C1, PVC plastisols comprising mixtures of the commercially available plasticizer Hexamoll® DINCH® with the gelling assistant dicyclohexyl adipate, in different proportions, were produced in order to investigate the gelling performance of PVC plastisols based on the plasticizer compositions of the invention.

Produced for comparison, moreover, were plastisols exclusively containing the commercially available plasticizers Hexamoll® DINCH® or Palatinol® N.

The production of the plastisols and the investigation of the gelling performance took place as described under C1).

PVC plastisols containing the aforesaid inventive plasticizer composition gel at significantly lower temperatures by comparison with the PVC plastisol containing exclusively the commercially available plasticizer Hexamoll® DINCH®. At a composition of just 73% Hexamoll® DINCH® and 27% dicyclohexyl adipate, a gelling temperature of 150° C. is obtained, which corresponds to the gelling temperature of the commercially available plasticizer Palatinol® N and which is sufficient for many plastisol applications. By further increasing the proportion of the dicyclohexyl adipate gelling assistant in the inventively employed plasticizer compositions, the gelling temperature of the plastisols can be further significantly lowered.

D2) Determination of the gelling performance of PVC plastisols based on the inventive plasticizer composition comprising compounds of the formula (II.a) in comparison to comparative PVC plastisols In order to compare the gelling performance of PVC plastisols comprising the inventive plasticizer compositions with that of PVC plastisols comprising plasticizer compositions made with conventional fast fusers, a procedure was adopted that was analogous to the method described in D1). In this case, first of all, the mixing ratio for the conventional fast fusers Vestinol® INB and Jayflex® MB 10 was determined with the commercially available plasticizer Hexamoll® DINCH®, which produces a gelling temperature of 150° C., corresponds to the gelling temperature of the commercially available plasticizer Palatinol® N, and for many plastisol applications is sufficient.

For Vestinol® INB, this mixing ratio lies at 55% Vestinol® INB and 45% Hexamoll® DINCH®, and for Jayflex® MB 10 it lies at 67% Jayflex® MB 10 and 33% Hexamoll® DINCH®.

Compiled in FIG. 1 are the gelling curves of the PVC plastisols with plasticizer compositions comprising the commercially available fast fusers Vestinol® INB and Jayflex® MB in comparison to the gelling curves of the PVC plastisols comprising the inventive plasticizer compositions. Further included as a comparison are the gelling curves of the PVC plastisols containing exclusively the commercially available plasticizers Hexamoll® DINCH® or Palatinol® N. It is very readily apparent from FIG. 1 that in the inventive plasticizer compositions a fraction of just 27% of the inventive fast fuser dicyclohexyl adipate is sufficient to obtain a gelling temperature of 150° C., which corresponds to the gelling temperature of the commercially available plasticizer Palatinol® N and which for many plastisol applications is sufficient. In contrast, in the case of the plasticizer compositions comprising the conventional fast fusers Vestinol® INB or Jayflex® MB 10, substantially higher proportions of 55% Vestinol® INB and 67% Jayflex® MB 10, respectively, are needed in order to obtain a plastisol gelling temperature of 150° C. The inventively employed fast fuser dicyclohexyl adipate, accordingly, possesses a much better gelling effect than the conventional fast fusers Vestinol® INB and Jayflex® MB 10.

D3) Determination of the process volatility of the inventive plasticizer compositions comprising compounds of the formula (II.a) in comparison to comparative plasticizer compositions and comparative plasticizers As described under D2), plastisols were produced with a plasticizer composition of 27% of the fast fuser dicyclohexyl adipate and 73% of the commercially available plasticizer Hexamoll® DINCH®, and with the plasticizer compositions of 55% of the commercially available gelling assistant Vestinol® INB and 45% of the commercially available plasticizer Hexamoll® DINCH®, and also with 67% of the commercially available fast fuser Jayflex® MB 10 and 33% of the commercially available plasticizer Hexamoll® DINCH®. The formula used was that described under C3).

For comparison, moreover, plastisols were produced that contained exclusively the commercially available plasticizers Hexamoll® DINCH® or Palatinol® N.

A foil precursor was produced and the process volatility was determined as described under C3).

As can be seen very readily from FIG. 2, the process volatility of the inventive plasticizer composition of 27% dicyclohexyl adipate and 73% Hexamoll® DINCH® is much lower than the process volatility of the plasticizer compositions of 55% Vestinol® INB and 45% Hexamoll® DINCH® and also of 67% Jayflex® MB 10 and 33% Hexamoll® DINCH®. The process volatility of the inventive composition is likewise lower than the volatility of a mixture of 20% di-n-butyl phthalate and 80% Hexamoll® DINCH®, and than the volatility of a mixture of 27% di-n-butyl adipate and 73% Hexamoll® DINCH®. In the processing of the plastisols based on the inventively employed plasticizer compositions, therefore, there are significantly lower losses of plasticizer.

The process volatility of the inventive plasticizer composition of 27% dicyclohexyl adipate and 73% Hexamoll® DINCH® is higher, however, than that of the pure plasticizers Hexamoll® DINCH® and Palatinol® N, respectively.

D4) Determination of the foil volatility of foils of plastisols comprising the inventive plasticizer compositions comprising compounds of the formula (II.a), in comparison to comparative foils For testing the foil volatility, plastisols were produced as described under D3), comprising the inventive plasticizer composition of 27% of the fast fuser dicyclohexyl adipate and 73% Hexamoll® DINCH®, as were plastisols with plasticizer compositions of 55% of the commercially available Vestinol® INB and 45% of Hexamoll® DINCH®, 67% of Jayflex® MB 10 and 33% of Hexamoll® DINCH®, 20% of di-n-butyl phthalate and 80% Hexamoll® DINCH®, and also a mixture of 27% di-n-butyl adipate and 73% Hexamoll® DINCH®. As a comparator, moreover, plastisols were produced containing exclusively the commercially available plasticizers Hexamoll® DINCH® or Palatinol® N.

Testing of the foil volatility took place as described under C4).

As can be seen very readily from FIG. 3, the foil volatility of the inventive plasticizer composition of 27% dicyclohexyl adipate and 73% Hexamoll® DINCH® is much lower than the foil volatility of the plasticizer compositions of 55% Vestinol® INB and 45% Hexamoll® DINCH® and also of 67% Jayflex® MB 10 and 33% Hexamoll® DINCH®. The foil volatility of the inventive composition is likewise lower than the volatility of a mixture of 20% di-n-butyl phthalate and 80% Hexamoll® DINCH®, and than the volatility of a mixture of 27% di-n-butyl adipate and 73% Hexamoll® DINCH®. In the case of PVC foils comprising the inventive plasticizer compositions, therefore, less plasticizer escapes in the completed plasticized PVC article.

The foil volatility of the inventive plasticizer composition of 27% dicyclohexyl adipate and 73% Hexamoll® DINCH® is higher, however, than that of the pure plasticizers Hexamoll® DINCH® and Palatinol® N, respectively.

D5) Determination of the Shore A hardness of foils produced from plastisols comprising the inventive plasticizer composition, in comparison to comparative foils For the determination of the Shore A hardness, as described under D3), foil sections measuring 49×49 mm were punched from the foil precursors and gelled at 190° C. for 2 minutes, in each case in a group of three, in analogy to the volatility test.

The Shore A hardness was determined as described under C5).

As can be seen very readily from FIG. 4, the Shore A hardness of the foil made from the plastisol with the plasticizer composition of 27% dicyclohexyl adipate and 73% Hexamoll® DINCH® is much lower than the Shore A hardness of the foils made from the plastisols with the plasticizer compositions of 55% Vestinol® INB and 45% Hexamoll® DINCH® and also 67% Jayflex® MB and 33% Hexamoll® DINCH®. The inventive use of plasticizer compositions comprising dicyclohexyl adipate and Hexamoll® DINCH® therefore results in a greater elasticity on the part of the PVC articles.

The Shore A hardness of the foil made from the plastisol having the plasticizer composition of 27% dicyclohexyl adipate and 73% Hexamoll® DINCH® is also much lower, furthermore, than the Shore A hardness of the foil made from the plastisol containing the pure plasticizer Hexamoll® DINCH®, and is approximately comparable to the Shore A hardness of the foil made from the plastisol containing the pure plasticizer Palatinol® N.

D6) Determination of the mechanical values of foils of plastisols comprising inventively employed plasticizer compositions comprising compounds of the formula (II.a), in comparison to comparative foils For the testing of mechanical values, plastisols were produced, as described under D3), from a plasticizer composition of 27% dicyclohexyl adipate and 73% Hexamoll® DINCH®, as were plastisols with the plasticizer compositions of 55% Vestinol® INB and 45% Hexamoll®

DINCH®, 67% Jayflex® MB and 33% Hexamoll® DINCH®, 20% di-n-butyl phthalate and 80% Hexamoll® DINCH®, and also a mixture of 27% di-n-butyl adipate and 73% Hexamoll® DINCH®. For comparison, moreover, plastisols were produced containing exclusively the commercially available plasticizers Hexamoll® DINCH® or Palatinol® N (DINP). For the tests here, however, a foil precursor was not first produced; instead, the plastisol was gelled directly in the Mathis oven at 190° C. for 2 min. The mechanical properties were tested on the resultant foils, whose thickness was about 0.5 mm.

The mechanical values were determined as described under C6),

The properties of the plastisol with the plasticizer composition of 27% dicyclohexyl adipate and 73% Hexamoll® DINCH® were as follows:

breaking stress: 17 MPa
100% modulus: 7.3 MPa
elongation at break: 330%

It emerged that the value of the elongation at break for the foil produced from the plastisol having the plasticizer composition of 27% dicyclohexyl adipate and 73% Hexamoll® DINCH® is much higher than the values for the foils produced from the plastisols with the plasticizer compositions of 55% Vestinol® INB and 45% Hexamoll® DINCH® and also 67% Jayflex® MB 10 and 33% Hexamoll® DINCH®, and is only a little lower than the values for the foils produced from the plastisols comprising exclusively the pure plasticizers Hexamoll® DINCH® and Palatinol® N.

The values of the breaking stress and of the 100% modulus for the foil produced from the plastisol of the plasticizer composition of 27% dicyclohexyl adipate and 73% Hexamoll® DINCH® are each situated in a similar range to those of the foils produced from the plastisols having the plasticizer compositions of 55% Vestinol® INB and 45% Hexamoll® DINCH® and also of 67% Jayflex® MB 10 and 33% Hexamoll® DINCH®, or of the plastisols comprising exclusively the pure plasticizers Hexamoll® DINCH® or Palatinol® N.

D7) Determination of the compatibility of foils produced from plastisols comprising the inventive plasticizer composition comprising compounds of the formula (II.a), in comparison to comparative foils The compatibility of plasticizers in plasticized PVC articles characterizes the extent to which plasticizers tend to exude from the plasticized PVC articles during use and thereby adversely affect the service properties of the PVC article.

For the testing of the compatibility, as described under D3), plastisols were produced with the inventive plasticizer composition of 27% of the fast fuser dicyclohexyl adipate and 73% of Hexamoll® DINCH®, as were plastisols with the plasticizer compositions of 55% Vestinol® INB and 45% Hexamoll® DINCH®, 67% Jayflex® MB and 33% Hexamoll® DINCH®, 20% di-n-butyl phthalate and 80% Hexamoll® DINCH®, and also a plasticizer composition of 27% di-n-butyl adipate and 73% Hexamoll® DINCH®. For comparison, moreover, plastisols were produced comprising exclusively the commercially available plasticizers Hexamoll® DINCH® or Palatinol® N.

The testing took place as described under C7).

As can be seen very readily from FIG. 5, the exudation behavior of the inventive plasticizer composition of 27% dicyclohexyl adipate and 73% Hexamoll® DINCH® is significantly better than the exudation behavior of the plasticizer compositions of 55% Vestinol® INB and 45% Hexamoll® DINCH®, 67% Jayflex® MB and 33% Hexamoll® DINCH®, 20% di-n-butyl phthalate and 80% Hexamoll® DINCH®, and also of a mixture of 27% di-n-butyl adipate and 73% Hexamoll® DINCH®, but somewhat poorer than the exudation behavior of the pure plasticizers Hexamoll® DINCH® and Palatinol® N.

E) Performance tests of plasticizer compositions comprising compounds of the formula (II.b)

E1) Determination of the gelling performance of PVC plastisols comprising the inventive plasticizer composition comprising compounds of the formula (II.b)

In accordance with the formula described under C1), PVC plastisols comprising mixtures of the commercially available plasticizer Eastman 168™ with the fast fuser dicyclohexyl adipate, in different proportions, were produced in order to investigate the gelling performance of PVC plastisols based on the plasticizer compositions of the invention.

Produced for comparison, moreover, were plastisols exclusively containing the commercially available plasticizers Eastman 168™ or Palatinol® N.

The production of the plastisols and the investigation of the gelling performance took place as described under C1).

PVC plastisols containing the aforesaid inventive plasticizer composition gel at significantly lower temperatures by comparison with the PVC plastisol containing exclusively the commercially available plasticizer Eastman 168™. At a composition of just 90% Eastman 168™ and 10% dicyclohexyl adipate, a gelling temperature of 150° C. is obtained, which corresponds to the gelling temperature of the commercially available plasticizer Palatinol® N and which is sufficient for many plastisol applications. By further increasing the proportion of the dicyclohexyl adipate fast fuser in the inventively employed plasticizer compositions, the gelling temperature of the plastisols can be further significantly lowered.

E2) Determination of the gelling performance of PVC plastisols based on the inventive plasticizer composition comprising compounds of the formula (II.b) in comparison to comparative PVC plastisols In order to compare the gelling performance of PVC plastisols comprising the inventive plasticizer compositions with that of PVC plastisols comprising plasticizer compositions made with conventional fast fusers, a procedure was adopted that was analogous to the method described in E1). In this case, first of all, the mixing ratio for the conventional fast fusers Vestinol® INB and Jayflex® MB 10 was determined with the commercially available plasticizer Eastman 168™, which produces a gelling temperature of 150° C., corresponds to the gelling temperature of the commercially available plasticizer Palatinol® N, and for many plastisol applications is sufficient.

For Vestinol® INB, this mixing ratio lies at 27% Vestinol® INB and 73% Eastman 168™ and for Jayflex® MB 10 it lies at 36% Jayflex® MB 10 and 64% Eastman 168™.

Compiled in FIG. 6 are the gelling curves of the PVC plastisols with plasticizer compositions comprising the commercially available fast fusers Vestinol® INB and Jayflex® MB in comparison to the gelling curves of the PVC plastisols comprising the inventive plasticizer compositions. Further included as a comparison are the gelling curves of the PVC plastisols containing exclusively the commercially available plasticizers Eastman 168™ or Palatinol® N. It is very readily apparent from FIG. 6 that in the inventive plasticizer compositions a fraction of just 10% of the inventive fast fuser dicyclohexyl adipate is sufficient to obtain a gelling temperature of 150° C., which corresponds to the gelling temperature of the commercially available plasticizer Palatinol® N and which for many plastisol applications is sufficient. In contrast, in the case of the plasticizer compositions comprising the conventional fast fusers Vestinol® INB or Jayflex® MB 10, substantially higher proportions of 27% Vestinol® INB and 36% Jayflex® MB 10, respectively, are needed in order to obtain a plastisol gelling temperature of 150° C. The inventively employed fast fuser dicyclohexyl adipate, accordingly, possesses a much better gelling effect than the conventional fast fusers Vestinol® INB and Jayflex® MB 10.

E3) Determination of the process volatility of the inventive plasticizer compositions comprising compounds of the formula (II.b) in comparison to comparative plasticizer compositions and comparative plasticizers The process volatility refers to the weight loss of plasticizer during the processing of plastisols. As described under E2), plastisols were produced with a plasticizer composition of 10% of the fast fuser dicyclohexyl adipate and 90% of the commercially available plasticizer Eastman 168™, and also 27% of the commercially available fast fuser Vestinol® INB and 73% of the commercially available plasticizer Eastman 168™, and also 36% of the commercially available fast fuser Jayflex® MB 10 and 64% of the commercially available plasticizer Eastman 168™. The formula used was that described under C3).

For comparison, moreover, plastisols were produced that contained exclusively the commercially available plasticizers Eastman 168™ or Palatinol® N.

A foil precursor was produced and the process volatility was determined as described under C3).

As can be seen very readily from FIG. 7, the process volatility of the inventive plasticizer composition of 10% dicyclohexyl adipate and 90% Eastman 168™ is much lower than the process volatility of the plasticizer compositions of 27% Vestinol® INB and 73% Eastman 168™ and also of 36% Jayflex® MB 10 and 64% Eastman 168™. In the processing of the plastisols based on the inventively employed plasticizer compositions, therefore, there are significantly lower losses of plasticizer.

The process volatility of the inventive plasticizer composition of 10% dicyclohexyl adipate and 90% Eastman 168™ is higher, however, than that of the pure plasticizers Eastman 168™ and Palatinol® N, respectively.

E4) Determination of the foil volatility of foils of plastisols comprising the inventive plasticizer compositions comprising compounds of the formula (II.b), in comparison to comparative foils For testing the foil volatility, plastisols comprising the inventive plasticizer composition of 10% of the fast fuser dicyclohexyl adipate and 90% of Eastman 168™ were produced, as described under E3), as were plastisols with plasticizer compositions of 27% of the commercially available Vestinol® INB and 73% of the commercially available plasticizer Eastman 168™, and also a plasticizer composition of 36% of the commercially available fast fuser Jayflex® MB 10 and 64% of the commercially available plasticizer Eastman 168™ As a comparator, moreover, plastisols were produced containing exclusively the commercially available plasticizers Eastman 168™ or Palatinol® N. For the tests here, however, a foil precursor was not first produced; instead, the plastisol was gelled directly in the Mathis oven at 190° C. for 2 min. The foil volatility was tested on the resulting foils, which had a thickness of about 0.5 mm.

Testing of the foil volatility took place as described under C4).

As can be seen very readily from FIG. 8, the foil volatility of the inventive plasticizer composition of 10% dicyclohexyl adipate and 90% Eastman 168™ is much lower than the foil volatility of the plasticizer compositions of 27% Vestinol® INB and 73% Eastman 168™ and also of 36% Jayflex® MB 10 and 64% Eastman 168™. In the case of PVC foils comprising the inventive plasticizer compositions, therefore, less plasticizer escapes in the completed plasticized PVC article.

The foil volatility of the inventive plasticizer composition of 10% dicyclohexyl adipate and 90% Eastman 168™ is higher, however, than that of the pure plasticizers Eastman 168™ and Palatinol® N, respectively.

E5) Determination of the Shore A hardness of foils produced from plastisols comprising the inventive plasticizer composition comprising compounds of the formula (II.b), in comparison to comparative foils The Shore A hardness is a measure of the elasticity of plasticized PVC articles. The lower the Shore hardness, the higher the elasticity of the PVC articles. For the determination of the Shore A hardness, as described under E3), foil sections measuring 49×49 mm were punched from the foil precursors and gelled at 190° C. for 2 minutes, in each case in a group of three, in analogy to the volatility test.

The Shore A hardness was determined as described under C5).

As can be seen very readily from FIG. 9, the Shore A hardness of the foil made from the plastisol with the plasticizer composition of 10% dicyclohexyl adipate and 90% Eastman 168™ is comparable with the Shore A hardness of the foils made from the plastisols with the plasticizer compositions of 27% Vestinol® INB and 73% Eastman 168™ and also 36% Jayflex® MB and 64% Eastman 168™. The inventive use of plasticizer compositions comprising dicyclohexyl adipate and Eastman 168™ therefore results in a comparable elasticity on the part of the PVC articles.

E6) Determination of the mechanical values of foils of plastisols comprising inventively employed plasticizer compositions comprising compounds of the formula (II.b), in comparison to comparative foils For the testing of mechanical values, plastisols were produced, as described under E3), from a plasticizer composition of 10% dicyclohexyl adipate and 90% Eastman 168™, as were plastisols with the plasticizer compositions of 27% Vestinol® INB and 73% Eastman 168™ and also 36% Jayflex® MB and 64% Eastman 168™ For comparison, moreover, plastisols were produced containing exclusively the commercially available plasticizers Eastman 168™ or Palatinol® N.

The mechanical values were determined as described under C6),

The properties of the plastisol with the plasticizer composition of 10% dicyclohexyl adipate and 90% Eastman 168™ were as follows:
  breaking stress: 17.5 MPa
  100% modulus: 7.6 MPa
  elongation at break: 330%

It emerged that the value of the elongation at break for the foil produced from the plastisol with the inventive plasticizer composition of 10% dicyclohexyl adipate and 90% Eastman 168™ is about the same as the values for the foils produced from the plastisols having the plasticizer compositions of 27% Vestinol® INB and 73% Eastman 168™, and only a little lower than the values for the foils produced from the plastisol having the plasticizer composition of 36% Jayflex® MB 10 and 64% Eastman 168™ and also from the plastisols comprising exclusively the pure plasticizers Eastman 168™ and Palatinol® N.

The values of the breaking stress and of the 100% modulus for the foil produced from the plastisol having the inventive plasticizer composition of 10% dicyclohexyl adipate and 90% Eastman 168™ are each situated in a similar range to those of the foils produced from the plastisols having the plasticizer compositions of 27% Vestinol® INB and 73% Eastman 168™ and also of 36% Jayflex® MB 10 and 64% Eastman 168™, or of the plastisols comprising exclusively the pure plasticizers Eastman 168™ or Palatinol® N.

E7) Determination of the compatibility of foils produced from plastisols comprising the inventive plasticizer composition comprising compounds of the formula (II.b), in comparison to comparative foils For the testing of the compatibility, as described under E3), plastisols were produced with the inventive plasticizer composition of 10% of the fast fuser dicyclohexyl adipate and 90% of Eastman 168™, as were plastisols with the plasticizer compositions of 27% Vestinol® INB and 73% Eastman 168™ and also 36% Jayflex® MB and 64% Eastman 168™, For comparison, moreover, plastisols were produced comprising exclusively the commercially available plasticizers Eastman 168™ or Palatinol® N.

The testing took place as described under C7).

As can be seen very readily from FIG. 10, the exudation behavior of the inventive plasticizer composition of 10% dicyclohexyl adipate and 90% Eastman 168™ is significantly better than the exudation behavior of the plasticizer compositions of 27% Vestinol® INB and 73% Eastman 168™, and also 36% Jayflex® MB and 64% Eastman 168™, but somewhat poorer than the exudation behavior of the pure plasticizers Eastman 168™ and Palatinol® N.

What is claimed is:

1. A plasticizer composition comprising
a) one or two or more compound(s) of the general formula (I),

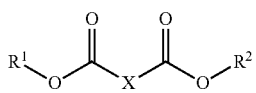

(I)

in which
X is an unbranched $C_2$-$C_8$ alkylene group or a branched $C_6$-$C_8$ alkylene group or an unbranched or branched $C_2$-$C_8$ alkenylene group, comprising at least one double bond, and
$R^1$ and $R^2$ independently of one another are selected from $C_5$-$C_7$ cycloalkyl, wherein the cycloalkyl radicals independently of one another either are unsubstituted or are substituted by at least one $C_1$-$C_{10}$ alkyl radical,
and
b) one or two or more compound(s) of the general formula (II),

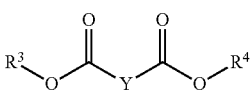

(II)

in which
$R^3$ and $R^4$ independently of one another are selected from branched and unbranched $C_4$-$C_{12}$ alkyl radicals,
Y is selected from the groups of the formulae (Y.a) and (Y.b)

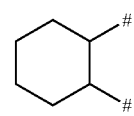

(Y.a)

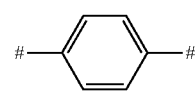

(Y.b)

where # represents the respective points of attachment to the ester groups,
with the proviso that the plasticizer composition contains no compound of the formula (I.a)

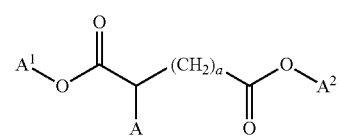

(I.a)

in which
A is methyl or ethyl,
$A^1$ and $A^2$ independently of one another are selected from branched and unbranched $C_5$-$C_7$ cycloalkyl radicals which are unsubstituted or are substituted by at least one $C_1$-$C_{10}$ alkyl radical, and
a is 1 or 2.

2. The plasticizer composition according to claim 1, wherein the compound of the general formula (II) is a compound of the general formula (II.a),

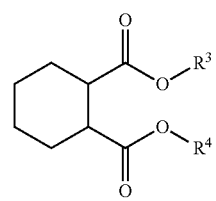

(II.a)

where
$R^3$ and $R^4$ independently of one another are selected from branched and unbranched $C_4$-$C_{12}$ alkyl radicals.

3. The plasticizer composition according to claim 1, wherein the compound of the general formula (II) is a compound of the general formula (II.b),

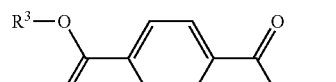

(II.b)

where
R³ and R⁴ independently of one another are selected from branched and unbranched $C_4$-$C_{12}$ alkyl radicals.

4. The plasticizer composition according to claim 1, wherein X in the compounds of the general formula (I) being an unbranched $C_2$-$C_5$ alkylene group.

5. The plasticizer composition according to claim 1, wherein R¹ and R² in the compounds of the general formula (I) independently of one another being cyclopentyl, cyclohexyl or cycloheptyl.

6. The plasticizer composition according to claim 1, wherein R¹ and R² in the compounds of the general formula (I) both being cyclohexyl.

7. The plasticizer composition according to claim 1, wherein R³ and R⁴ in the compounds of the general formula (II) both being 2-ethylhexyl, both being isononyl or both being 2-propylheptyl.

8. The plasticizer composition according to claim 1, which further comprises a plasticizer which is different from the compounds (I), (I.a), and (II) and which is phthalic dialkyl esters, phthalic alkyl aralkyl esters, trimellitic trialkyl esters, esters of 1,2-cyclohexanedicarboxylic acids, different from compounds (II), terephthalic dialkyl esters different from compounds (II), 1,3- and 1,4-cyclohexanedicarboxylic alkyl esters, benzoic alkyl esters, dibenzoic esters of glycols, hydroxybenzoic esters, esters of saturated monocarboxylic acids, esters of saturated and unsaturated dicarboxylic acids other than compounds (I) and (I.a), amides and esters of aromatic sulfonic acids, alkylsulfonic esters, glycerol esters, isosorbide esters, phosphoric esters, citric triesters, alkylpyrrolidone derivatives, 2,5-furandicarboxylic esters, 2,5-tetrahydrofurandicarboxylic esters, epoxidized vegetable oils, epoxidized fatty acid monoalkyl esters, and polyesters of aliphatic and/or aromatic polycarboxylic acids with at least dihydric alcohols.

9. The plasticizer composition according to claim 1, wherein the amount of compounds of the general formula (I) in the plasticizer composition being 1 to 70 wt %.

10. The plasticizer composition according to claim 1, wherein the amount of compounds of the general formula (II) in the plasticizer composition being 30 to 99 wt %.

11. The plasticizer composition according to claim 1, wherein the weight ratio between compounds of the general formula (I) and compounds of the general formula (II) being in the range from 1:100 to 2:1.

12. A molding composition comprising at least one polymer and a plasticizer composition as claimed in claim 1.

13. The molding composition according to claim 12, wherein the polymer being a thermoplastic polymer selected from the group consisting of:

homopolymers or copolymers comprising in copolymerized form at least one monomer selected from $C_2$-$C_{10}$ monoolefins, 1,3-butadiene, 2-chloro-1,3-butadiene, vinyl alcohol and its $C_2$-$C_{10}$ alkyl esters, vinyl chloride, vinylidene chloride, vinylidene fluoride, tetrafluoroethylene, glycidyl acrylate, glycidyl methacrylate, acrylates and methacrylates of $C_1$-$C_{10}$ alcohols, vinylaromatics, acrylonitrile, methacrylonitrile, maleic anhydride, and α,β-ethylenically unsaturated monocarboxylic and dicarboxylic acids,
homopolymers and copolymers of vinyl acetals,
polyvinyl esters,
polycarbonates,
polyesters,
polyethers,
polyetherketones,
thermoplastic polyurethanes,
polysulfides,
polysulfones,
polyethersulfones,
cellulose alkyl esters,
and mixtures thereof.

14. The molding composition according to claim 13, wherein the thermoplastic polymer is polyvinyl chloride (PVC), polyvinyl butyral (PVB), homopolymers and copolymers of vinyl acetate, homopolymers and copolymers of styrene, polyacrylates, thermoplastic polyurethanes (TPU), or polysulfides.

15. The molding composition according to claim 13, wherein the thermoplastic polymer being polyvinyl chloride (PVC).

16. The molding composition according to claim 15, wherein the amount of the plasticizer composition in the molding composition being 5.0 to 300 phr.

17. The molding composition according to claim 12, which further comprises at least one thermoplastic polymer other than polyvinyl chloride, the amount of the plasticizer composition in the molding composition being 0.5 to 300 phr.

18. The molding composition according to claim 12, wherein the polymer being an elastomer, selected from the group consisting of natural rubbers, synthetic rubbers, and mixtures thereof.

19. The molding composition according to claim 18, wherein the amount of the plasticizer composition in the molding composition being 1.0 to 60 phr.

20. A plastisol composition comprising the plasticizer composition as defined in claim 1.

* * * * *